(12) United States Patent
Willnow et al.

(10) Patent No.: US 11,945,410 B2
(45) Date of Patent: Apr. 2, 2024

(54) LADDER RACK SYSTEM

(71) Applicant: Adrian Steel Company, Adrian, MI (US)

(72) Inventors: Elizabeth Elaine Willnow, Adrian, MI (US); Mark Anthoney Henry, Jr., Adrian, MI (US); Joshua Michael Gerez, Tecumseh, MI (US); Scott Donald Lee, Frankenmuth, MI (US); Robert Michael Butcher, Saint Charles, MI (US)

(73) Assignee: Adrian Steel Company, Adrian, MI (US)

(*) Notice: Subject to any disclaimer, the term of this patent is extended or adjusted under 35 U.S.C. 154(b) by 0 days.

(21) Appl. No.: 18/054,175

(22) Filed: Nov. 10, 2022

(65) Prior Publication Data
US 2023/0202402 A1 Jun. 29, 2023

Related U.S. Application Data

(60) Provisional application No. 63/268,855, filed on Mar. 4, 2022, provisional application No. 63/263,891, filed on Nov. 11, 2021.

(51) Int. Cl.
*B60R 9/042* (2006.01)
*B60R 9/048* (2006.01)

(52) U.S. Cl.
CPC .................. *B60R 9/0485* (2013.01)

(58) Field of Classification Search
CPC ......... B60P 3/1008; B60R 9/04; B60R 9/042; B60R 9/0423; B60R 9/0426; B60R 9/045; B60R 9/0485; B60R 9/052; B60R 9/08

USPC .......................................................... 224/324
See application file for complete search history.

(56) References Cited

U.S. PATENT DOCUMENTS

| | | | |
|---|---|---|---|
| 2,551,351 A | 5/1951 | Swenson |
| 3,460,694 A | 8/1969 | Simms |
| 3,480,166 A | 11/1969 | Abbott |
| 5,058,791 A | 10/1991 | Henriquez et al. |
| 5,297,912 A | 3/1994 | Levi |
| 5,398,778 A | 3/1995 | Sexton |
| 5,884,824 A | 3/1999 | Spring, Jr. |
| 6,315,181 B1 | 11/2001 | Bradley et al. |
| 6,360,930 B1 | 3/2002 | Flickenger |
| 6,428,263 B1 | 8/2002 | Schellens |
| 7,097,409 B2 | 8/2006 | Richter |
| 7,549,831 B2 | 6/2009 | Hendley et al. |
| 9,132,780 B2 | 9/2015 | Sautter, Jr. et al. |
| 9,193,304 B2 | 11/2015 | Svaldi et al. |

(Continued)

FOREIGN PATENT DOCUMENTS

| | | | | |
|---|---|---|---|---|
| EP | 2551151 B1 | 12/2016 | | |
| GB | 2277554 A | * 11/1994 | ........... | B60R 9/0423 |

(Continued)

*Primary Examiner* — Peter N Helvey
*Assistant Examiner* — Matthew T Theis
(74) *Attorney, Agent, or Firm* — Marshall & Melhorn, LLC

(57) ABSTRACT

A ladder rack system may have a slide with a support flange and a spanning flange. The system may also have a ladder support member adapted to selectively receive a portion of the support flange therein. The system may also have a pivot bracket pivotally connected to the ladder support member. The pivot bracket may be adapted to selectively move the ladder support member.

28 Claims, 31 Drawing Sheets

(56) References Cited

U.S. PATENT DOCUMENTS

| | | | |
|---|---|---|---|
| 9,327,654 B2 | 5/2016 | Richter et al. | |
| 9,346,409 B2 | 5/2016 | Pfaeffli | |
| 9,371,040 B2 | 6/2016 | Townsend | |
| 9,415,726 B2 | 8/2016 | Levi | |
| 9,457,727 B2 | 10/2016 | Hobbs | |
| 9,630,565 B2 | 4/2017 | Gallagher | |
| 9,694,756 B2 * | 7/2017 | Pullman | B60R 9/045 |
| 10,017,124 B2 | 7/2018 | Lachance et al. | |
| 10,189,417 B1 | 1/2019 | Morken | |
| 10,189,418 B2 | 1/2019 | Willis | |
| 10,406,987 B1 | 9/2019 | Lester | |
| 10,647,262 B2 * | 5/2020 | Müller | B60R 9/042 |
| 10,766,427 B2 * | 9/2020 | Livingston | B60R 9/0423 |
| 10,780,837 B2 * | 9/2020 | Sautter | B60R 9/0426 |
| 10,814,793 B2 | 10/2020 | Harrell et al. | |
| 10,926,709 B2 | 2/2021 | Herriman et al. | |
| 2005/0236228 A1 | 10/2005 | Thibault | |
| 2006/0185933 A1 | 8/2006 | Thibault | |
| 2006/0280583 A1 | 12/2006 | Settelmayer et al. | |
| 2011/0038698 A1 * | 2/2011 | Li | B60P 3/14 414/479 |
| 2015/0048127 A1 | 12/2015 | Sutton et al. | |
| 2017/0341590 A1 | 11/2017 | McLauchlan | |
| 2018/0257578 A1 * | 9/2018 | Levi | B60R 9/0423 |
| 2020/0180515 A1 | 6/2020 | Dimmen et al. | |
| 2021/0061181 A1 | 3/2021 | Bica et al. | |
| 2021/0253033 A1 | 8/2021 | Gentili et al. | |

FOREIGN PATENT DOCUMENTS

| | | |
|---|---|---|
| WO | 2014134712 A1 | 9/2014 |
| WO | 2016133413 A1 | 8/2016 |
| WO | 2017134480 A1 | 8/2017 |

* cited by examiner

LADDER RACK SYSTEM

FIELD

Embodiments of a vehicle mounted ladder rack system are described and depicted.

BACKGROUND

Ladder racks are devices used to store and transport equipment and ladders on the exterior, such as the roof, of a vehicle. In most cases, existing ladder racks have a fixed width across the vehicle. Further, the existing ladder racks have a fixed height above the vehicle. In other words, the existing ladder racks are designed to be installed on the roof of the vehicle in a fixed, ready-to-use condition.

A significant problem with the prior art racks is that when they are installed on a vehicle, the vehicle and rack made further transportation of the vehicle very difficult. For example, a vehicle with a rack installed on its roof will not fit in a standard size railroad car, which is the preferred mode of transportation of the combined rack and vehicle. One reason for this is that most standard size railroad cars have a sloped, or rounded roof. This roof style reduces the available space within the rail car and a vehicle with a roof rack will not fit.

In view of the problems associated with the prior art racks, it would be advantageous for a ladder rack to selectively adapt to reduce width and height requirements so that transportation of the combined rack and vehicle can be accomplished.

SUMMARY

In one aspect, a ladder rack system may have a roof bow having an upper channel and a side surface. The system may also have a slide having a generally U-shaped support flange and a spanning flange. The spanning flange may be slidingly connected to the upper channel and the support flange may be adjacent the side surface. The system may also have a ladder support member having a lower groove adapted to selectively receive a portion of the support flange therein. The system may also have a pivot bracket pivotally connected to the ladder support member. The pivot bracket may be adapted to selectively move the ladder support member with respect to the slide.

In another aspect, a ladder rack system may have a slide comprising a two walled support flange and a spanning flange. The first portion of the spanning flange may be slidingly connected to, and overlap with, a roof bow and a second portion of the spanning flange may be adapted to selectively extend off the roof bow. The system may also have a ladder support member adapted to selectively pivot with respect to the second portion, where the ladder support member may receive a portion of one of the walls of the support flange therein. The system may also have a biasing member having a first end connected to the roof bow and a second end connected to a pivot bracket.

In another aspect, a slide for a ladder rack system may have a support flange comprising a first wall and a second wall, the walls may be generally parallel one another. The walls may be spaced apart and connected by a connector wall to generally define a U-shape. The second wall may have a roller assembly connected thereto. A spanning flange may be cantilevered from the first wall, where the spanning flange may have an outboard edge portion angled between a first edge portion and a second edge portion.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

Figure 1:
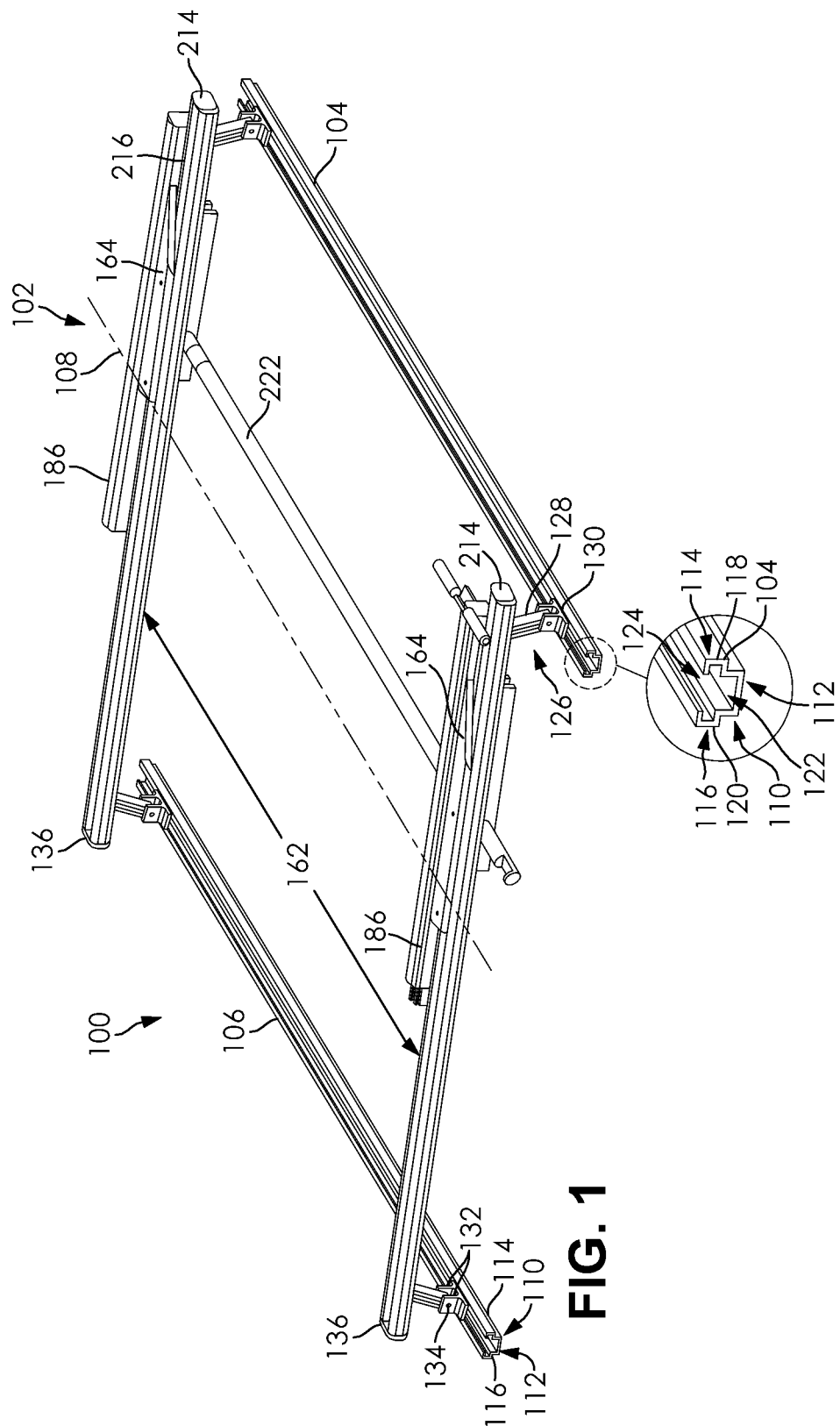
FIG. 1 schematically depicts an upper perspective view of one embodiment of a ladder rack system for a vehicle in a ship through condition.

It is to be understood that the device described herein may assume various alternative orientations and step sequences, except where expressly specified to the contrary. It is also to be understood that the specific devices and processes illustrated in the attached drawings, and described in the following specification are simply exemplary embodiments of the concepts herein. Hence, specific dimensions, directions or other physical characteristics relating to the embodiments disclosed are not to be considered as limiting.

Turning now to FIGS. 1-10, one embodiment of a roof rail system 100 adapted for use with a vehicle is schematically depicted. The vehicle may be such as a cargo van type vehicle, but the system 100 may be used with other vehicles and it is not limited to cargo van type vehicles. The roof rail system 100 may be part of a ladder rack system 102, or the ladder rack system 102 may exist without the roof rail system 100.

In some embodiments, the system 100 may be comprised of a first and a second rail 104, 106. The rails 104, 106 may be the same or they may different in shape, size and/or materials. In the depicted exemplary embodiment, the rails 104, 106 may be substantially the same. The rails 104, 106 may be positioned generally parallel and spaced apart from one another. In some embodiments the rails 104, 106 may be parallel with a longitudinal axis 108 of the vehicle.

The rails 104, 106 may have a generally C-shaped cross section with a lower portion 110 comprising an attachment portion 112. While a C-shape is mentioned, other cross-sections such as I-shaped or T-shaped may also be used.

The attachment portion 112 may be located on a substrate, such as the exterior roof surface of the vehicle. The rails 104, 106 may be connected to the substrate through mechanical fasteners, welding, adhesives, and/or they may be integrally formed therewith.

The C-shape may be further formed by first and second upstanding flanges 114, 116 separated from one another by the lower portion 110 so that a gap may be located between the flanges 114, 116. Each upstanding flange 114, 116 may have a first portion 118 and a second portion 120.

Each first portion 118 may be directly connected to the lower portion 110 and extend therefrom such as at an angle, including a generally transverse angle with respect to the lower portion 110. Each first portion 118, along with the lower portion 110, may define a first channel 122. The first channel 122, defined by the first portions 118 and the lower portion 110, may extend substantially continuously along the rails 104, 106 at a substantially constant first width.

Each second portion 120 may be directly connected to the respective first portion 118, such as to a top portion of the first portion 118, and extend therefrom, such as at an angle including a generally transverse angle with respect to the first portion 118. Each second portion 120 may define a second channel 124. The second channel, defined by the second portions 120, may extend substantially continuously along the rails 104, 106 at a substantially constant width that is greater than the first width. Each second portion 120 may have an inwardly extending lip in a generally transverse direction to the second portion. The lips may extend to at least partially enclose the second channel 124.

The first and/or second channels 122, 124 in the rails 104, 106 may be adapted to receive a roof bow mounting portion 126 at least partially therein. In one embodiment, shown in FIGS. 1 and 10, the mounting portion 126 may be comprised of a riser 128. In some embodiments, the riser 128 may be comprised of two parallel sections of material that are separated from one another by a gap. The riser 128 may be located at an acute angle (viewed along the longitudinal axis of the vehicle), but other angles may be permissible. In other embodiments, the riser 128 may be a single piece that may or may not be located at an acute angle.

The roof bow mounting portion 126 may also be comprised of a base portion 130. The base portion 130 may be selectively pivotable with respect to the riser 128. The base portion 130 may have two upstanding ears 132 with aligned apertures extending through the ears. The riser 128 may also have an aperture extending therethrough, which may be adapted to align with the ear apertures. A fastener 134 may extend through the ear apertures and the riser aperture. A nut may be located on one end of the fastener 134 extending through one of the ears to fix the fastener in the apertures and secure the base portion 130 position with respect to the riser 128. The nut may be loosened, the base portion 130 pivoted at a desired angle with respect to the riser 128, and then the nut may be tightened to secure the base portion 130 at the desired angle to the riser 128. In this way, the base portion 130 may be adjusted to match the pitch or angle of the roof surface of the vehicle.

The base portion 130 may be sized and shaped to be slidably captured within at least the second channel 124. In other words, the base portion 130 may selectively slide within at least the second channel 124, where it can be located in a desired position along one of the rails 104, 106. Mechanical fasteners can be used to lock the base portion 130 to a rail 104, 106. The base portion 130 may also be similarly adapted to fit within the first channel 122, or the first and second channels 122, 124.

In some embodiments, an insert may be located within the first and/or second channel 122, 124 of a rail 104, 106. The insert may be selectively slidable within the channel(s) 104, 106. Fasteners may extend through the base portion 130 into the insert to connect them. Further, the fasteners may draw the insert into locking engagement with the rail 104, 106 to lock the insert end and the mounting portion to the rail 104, 106.

The rails 104, 106 and the roof bow mounting portions 126 may be constructed of a robust material capable of withstanding harsh outdoor environments in which vehicles operate. In some embodiments, the rails 104, 106 and the roof bow mounting portions 126 may be constructed of the same material, but they may be constructed of different materials. Possible materials for the rails 104, 106 and the roof bow mounting portions 126 may include metals, plastics, polymers and/or composite materials. If constructed of metal the rails 104, 106 may be such as an extruded aluminum alloy.

Figure 10:
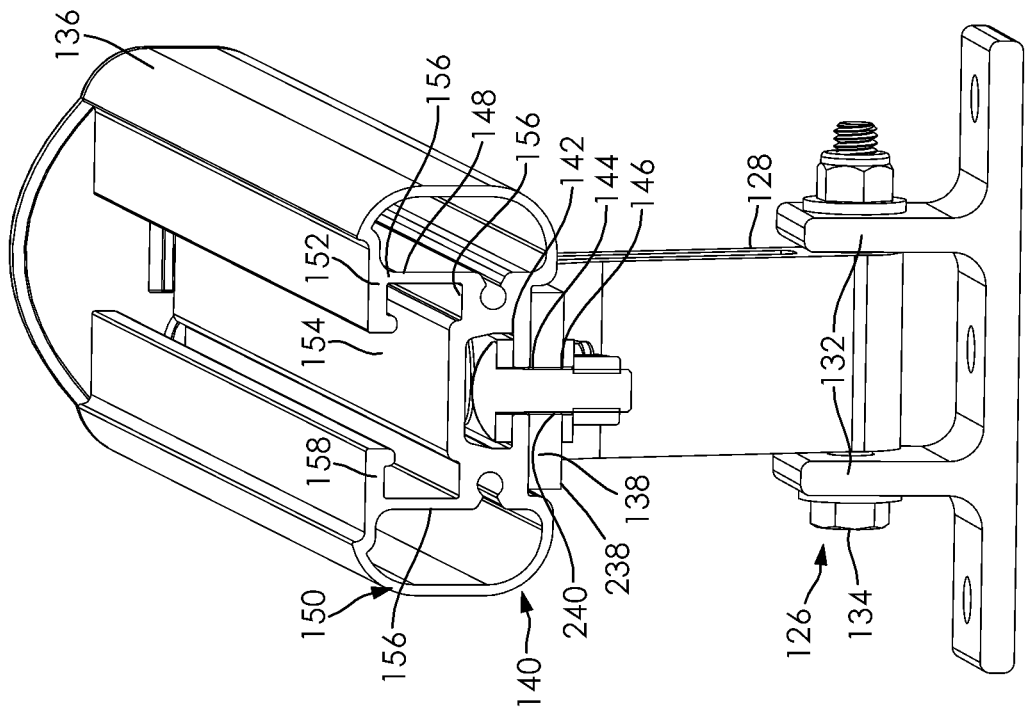
FIG. 10 depicts one embodiment of a cross-section of a roof bow.

As best seen in FIG. 10, a roof bow 136 may have a lower channel 138. The lower channel 138 may be located in a lower portion 140 of the roof bow 136. The lower channel 138 may extend continuously along the lower portion 140. In some embodiments, the lower channel 138 may extend substantially continuously with a continuous width from a first end to a second end of the roof bow 136. The lower channel 138 may extend from the two ends with substantially the same cross-sectional profile or shape.

The lower channel 138 may be in communication with an intermediate channel 142, located above the lower channel 138. The two channels 138, 142 may be connected by a fastener channel 144. The intermediate channel 142 may extend from the first to the second end of the roof bow 136 with substantially the same cross-sectioned profile or shape. A fastener 146 may be located in the fastener channel 144 and the lower channel 138 where the fastener 146 may selectively slide within the channels 138, 144. The fastener 146 is connected to the riser 128.

The roof bow 136 may also have an upper channel 148. The upper channel 148 may extend parallel the intermediate channel 138 and be located substantially above it. The upper channel 148 may be located in an upper portion 150 of the roof bow 136. The upper channel 148 may extend continuously along the upper portion 150. In some embodiments, the upper channel 148 may extend substantially continuously from the first end to the second end of the roof bow 136. The upper channel 148 may extend from the two ends with substantially the same cross-sectional profile or shape.

The upper channel 148 may bisect an upper surface 152 of the roof bow 136 to create two portions, which may be flats, on either side of the channel 148.

In some embodiments, the upper channel 148 may have a base 154, two side walls 156 that may be transverse the base 154, and an upper flange 158 extending transverse each side wall 156. In some cases, each upper flange 158 may have a downwardly extending lip 160 located transverse the upper flange 158. The downward extending lips 160 may be parallel the side walls 156 but only extend a portion of their height. The side walls 156 may be in any orientation with respect to one another including parallel.

In some embodiments, the ladder rack system 102 may be comprised of a first roof bow 136 and a second roof bow 136. In other embodiments, the system 102 may exist without the roof bows 136, or more than two roof bows 136 may be used.

The two roof bows 136 may be substantially the same in shape, size and construction. Often, the two roof bows 136 may extend substantially parallel one another above the exterior roof surface of the vehicle. While they may be substantially parallel, the two roof bows 136 may be separated from one another by a gap 162. The width of the gap 162 may vary according to the type of vehicle the system may be located on, as well as the type of ladders that may be located on the system 102. The roof bows 136 may be attached to the roof bow mounting portions 126 and then to the rails 104, 106 as described above.

In some embodiments, the ladder rack system 102 may be comprised of a slide 164. The slide 164 may be constructed in a single, unitary, integrally formed piece or it may be formed in two or more pieces. Regardless of the number of pieces, the slide 164 may have a support flange 166 and a spanning flange 168, which may be seen in FIG. 8.

Figure 8:
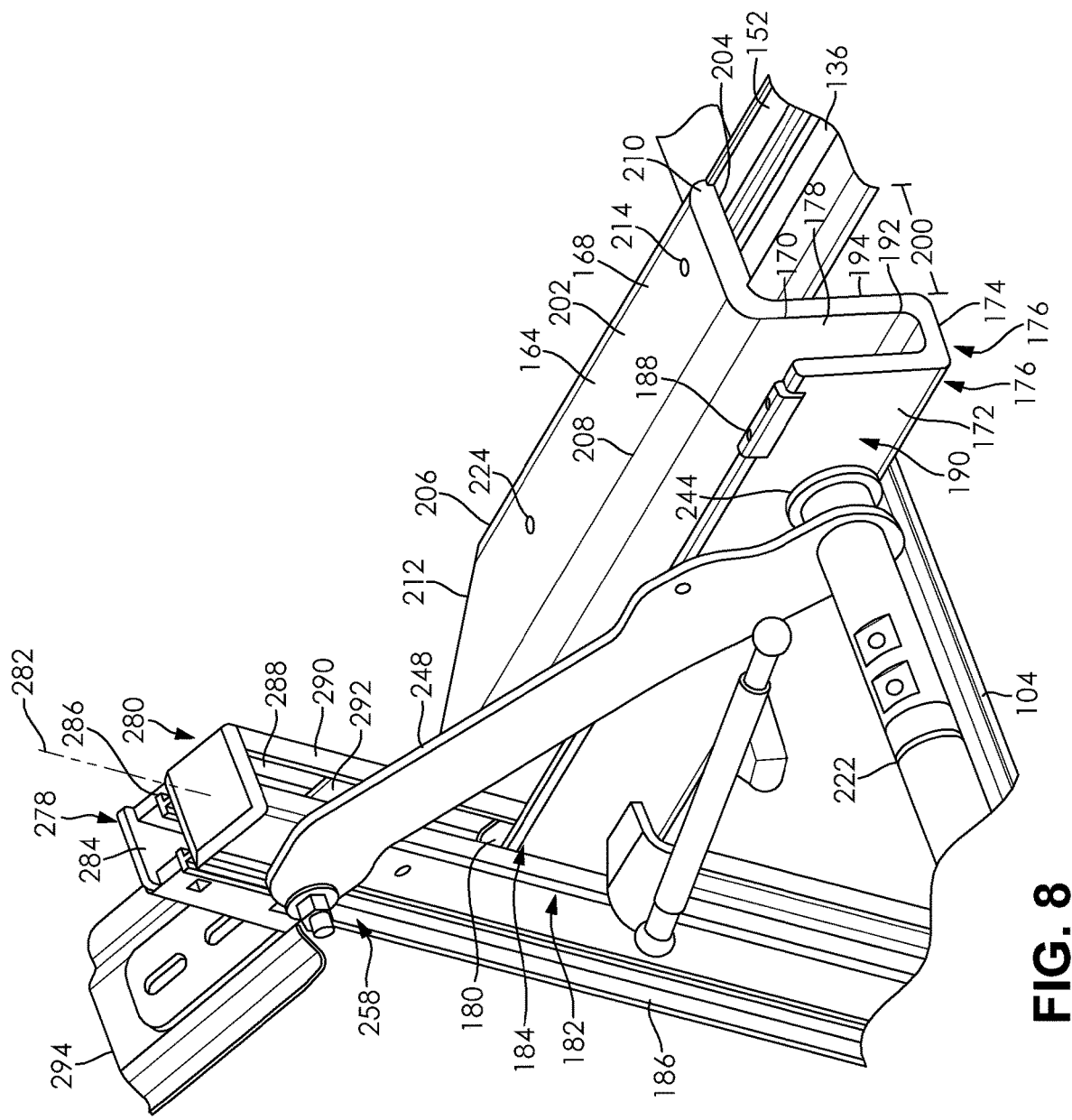
FIG. 8 depicts another view of the ladder rack system in an extended and deployed condition.
Figure 9:
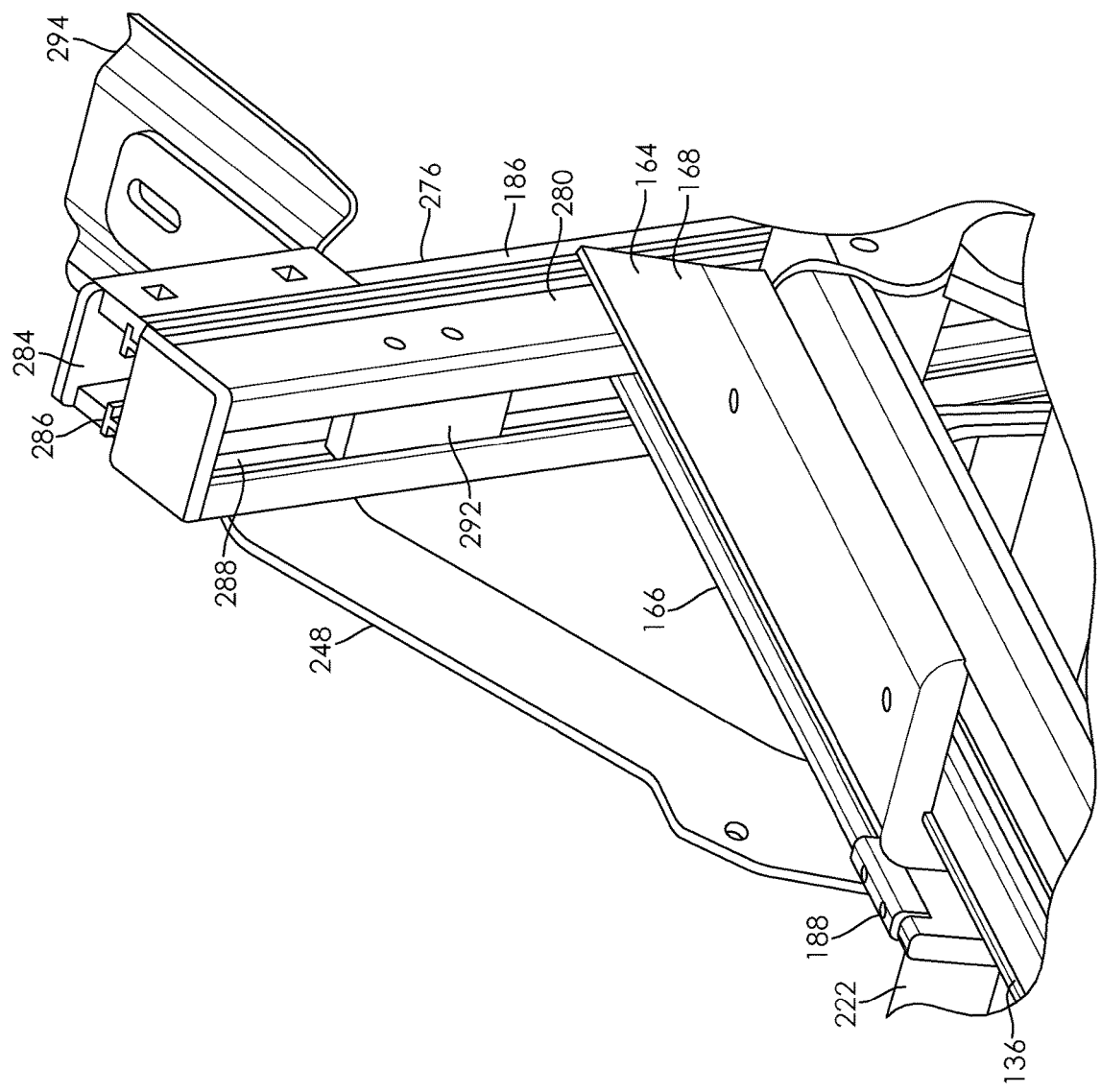
FIG. 9 depicts another view of the ladder rack system in an extended and deployed condition.

As may be appreciated in FIGS. 8 and 9 the support flange 166 may have a U-shaped cross-section for at least part of its length. In some embodiments, the U-shaped cross-section may extend substantially the entire length of the support flange 166. While a U-shape cross-section is mentioned and depicted, other shapes are permissible.

The U-shape may be formed from first and second substantially parallel walls 170, 172 connected by a connector wall 174. The first and second walls 170, 172 may be of substantially equal height, thickness and length compared to one another, but other constructions are permissible. The first and second walls 170, 172 may extend the length of the support flange 166. The connector wall 174 may be located at a bottom portion 176 of the first and second walls 170, 172 and extend substantially transverse to the first and second walls 170, 172.

A slide channel 178 may be formed between first and second walls 170, 172 and the connector wall 174. The slide channel 178 may extend substantially the length of the first and second walls 170, 172. Further, the slide channel 178 may be substantially continuous and uninterrupted along the length of the first and second walls 170, 172.

In some embodiments, at least one roller 180, which may be such as a wheel, bearing or bushing, may be located on an outboard, or end, portion 182 of the second wall 172. The roller 180 may be mounted on an axle that is connected to the second wall 172, such as at an upper portion 84 of the second wall 172. In other embodiments, at least one pivoting gliding block and/or other friction reducing devices may be used instead of the roller 180.

Two rollers 180 may be mounted on the axle such that one roller 180 is cantilevered from the second wall 172 into the slide channel 178, and another roller 180 is cantilevered from the opposite side of the second wall 172. The rollers 180 may be adapted to engage with a ladder support member 186 to facilitate selective movement of the ladder support member 186 with respect to the support flange 166.

Some embodiments may locate a first resilient member 188 on the second wall 172. The resilient member 188 may be located on an inboard, or end, portion 190 of the second wall 172. The resilient member 188 may be such as an elastomeric, plastic, and/or rubber or rubber compound material. The resilient member 188 may clip shaped so that it can be attached to the second wall 172 in a form fitting and securing manner. The resilient member 188 may function as a shock absorber for the ladder support member 186, which may selectively rest on the resilient member 188.

In some embodiments, the first wall 170 may have a first side surface 192 and a second side surface 194. The two side surfaces 192, 194 may be substantially parallel one another and be separated by a substantially constant thickness. The first wall 170 may also have an upper edge portion 196 and a lower edge portion 198. The second side surface 194 may extend substantially parallel the roof bow 136. A gap 200 may separate the second side surface 194 from the roof bow 136 to permit selective relative movement.

The spanning flange 168 may be connected to, such as cantilevered from, the upper edge portion 196 of the first wall 170. In such cases, the spanning flange 168 may overlap, or extend over, the second side surface 194 of the first wall 170.

The spanning flange 168 may extend substantially transversely from the support flange 166, such as in a cantilevered fashion. The spanning flange 168 may have an upper surface 202, a lower surface 204, a first edge portion 206, a second edge portion 208, an inboard edge portion 210, and an outboard edge portion 212. The upper and lower surfaces 202, 204 may be substantially parallel one another and may be separated by a substantially constant thickness. In some embodiments, the upper and lower surfaces 202, 204 of the spanning flange 168 may be parallel but non-planar with the connector wall 174.

The inboard edge portion 210 may extend substantially transverse the upper and lower surfaces 202, 204. In some embodiments, the outboard edge portion 212 may be angled from the first edge portion 206 to the second edge portion 208. The angle maybe such as an acute angle when measured from the first edge portion 206. In these embodiments, the second edge 208 portion may have a longer length than the first edge portion 206.

In some embodiments, the lower surface 204 of the spanning flange 168 may be in direct contact with the upper surface 152 of the roof bow 136. In other embodiments, there may be a small gap between the upper surface 152 of the roof bow 136 and the lower surface 204 of the spanning flange 168. It may be preferable, however, to keep the gap to a minimum so that the lower surface 204 of the spanning flange 168 is as close to co-planar with the upper surface 152 of the roof bow 136 so as to minimize the height profile of the system 102.

In one embodiment depicted in FIG. 1, the ship condition may have the entire slide 164 moved with respect to the roof bow 136 such that no part of the slide 164 extends beyond an end 214 of the roof bow 136. In such an embodiment, the entire slide 164 moved with respect to the roof bow 136 such that a length 216 of roof bow 136 exists between the outboard edge portion 212 of the spanning flange 168 and the end 214 of the roof bow 136. In other words, in this condition there is a length 216 of roof bow 136 from the outboard edge portion 212 of the spanning flange 168 to the end 214 of the roof bow 136 that is not covered by the slide 164. In such a condition, it may be that no part of the slide 164 may extend over the rails 104, 106. In another related embodiment, a handle system 218 (described below) connected to the ladder support member 186 (described below) may extend in whole or in part over a rail 104 or 106 and/or the ladder support member 186 may extend in whole or in part over the rail 104, 106. There are other embodiments, however, where a portion of the slide 164, such as the outboard edge portion 212, may at least partially extend over the rails 104 or 106.

Figure 2:
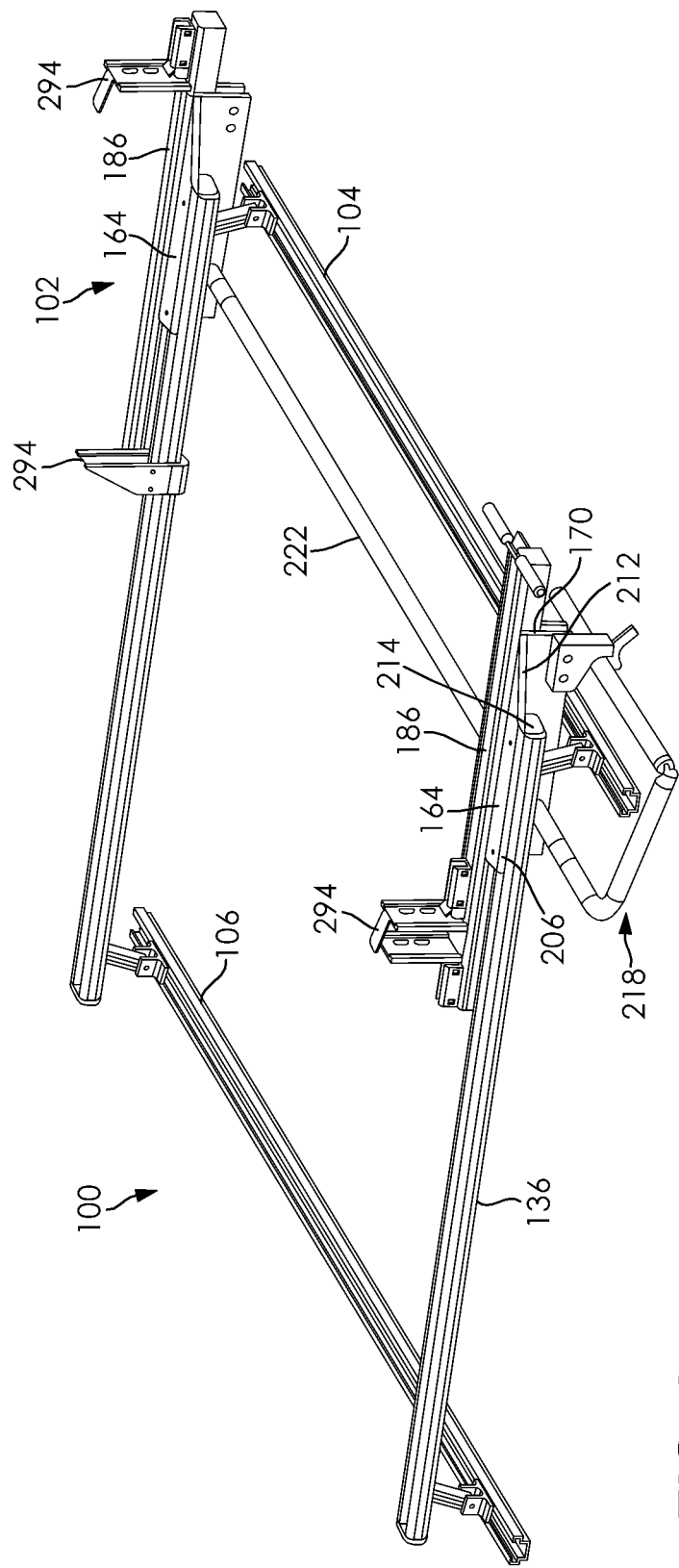
FIG. 2 depicts the ladder rack system from FIG. 1 in an extended or operational condition.

In another condition one embodiment of which is shown in FIG. 2, such as an extended or operating condition, the slide 164 may be extended to the end 214, or adjacent the end, of the roof bow 136. In one such embodiment, the slide 164 may be located on the roof bow 136 such that an intersection of the first edge portion 206 and the outboard edge portion 212 are at, or adjacent, the end 214 of the roof bow 136. In this embodiment, the outboard end portion 212 may extend beyond the end 214 of the roof bow 136 at least to some extent. Such an embodiment may permit substantially all of the outboard edge portion 212 to extend beyond the roof bow 136. Similarly, a portion of the support flange 166, such as the first wall 170, may also extend beyond the end 214 of the roof bow 136, also at least to some extent. The above-described portion of the support flange 166 may be selectively cantilevered off of the end 214 of the roof bow 136. In this condition, the outboard end portion 212 and the above-mentioned portion of the support flange 166 may also extend beyond, such as outboard, the first or second rail 104, 106 as the case may be. The extended condition may generally center the first edge portion 206 above a pivot rod 222 (described below).

In some embodiments shown in FIGS. 5, 7, 8 and 9, one or more apertures 224 may be located in the spanning flange 168. The apertures 224 may extend from the upper surface 202 through the thickness of the spanning flange 168 to the lower surface 204. In one embodiment, there may be two apertures 224 in the spanning flange 168 adapted to accommodate fasteners therethrough.

Figure 7:
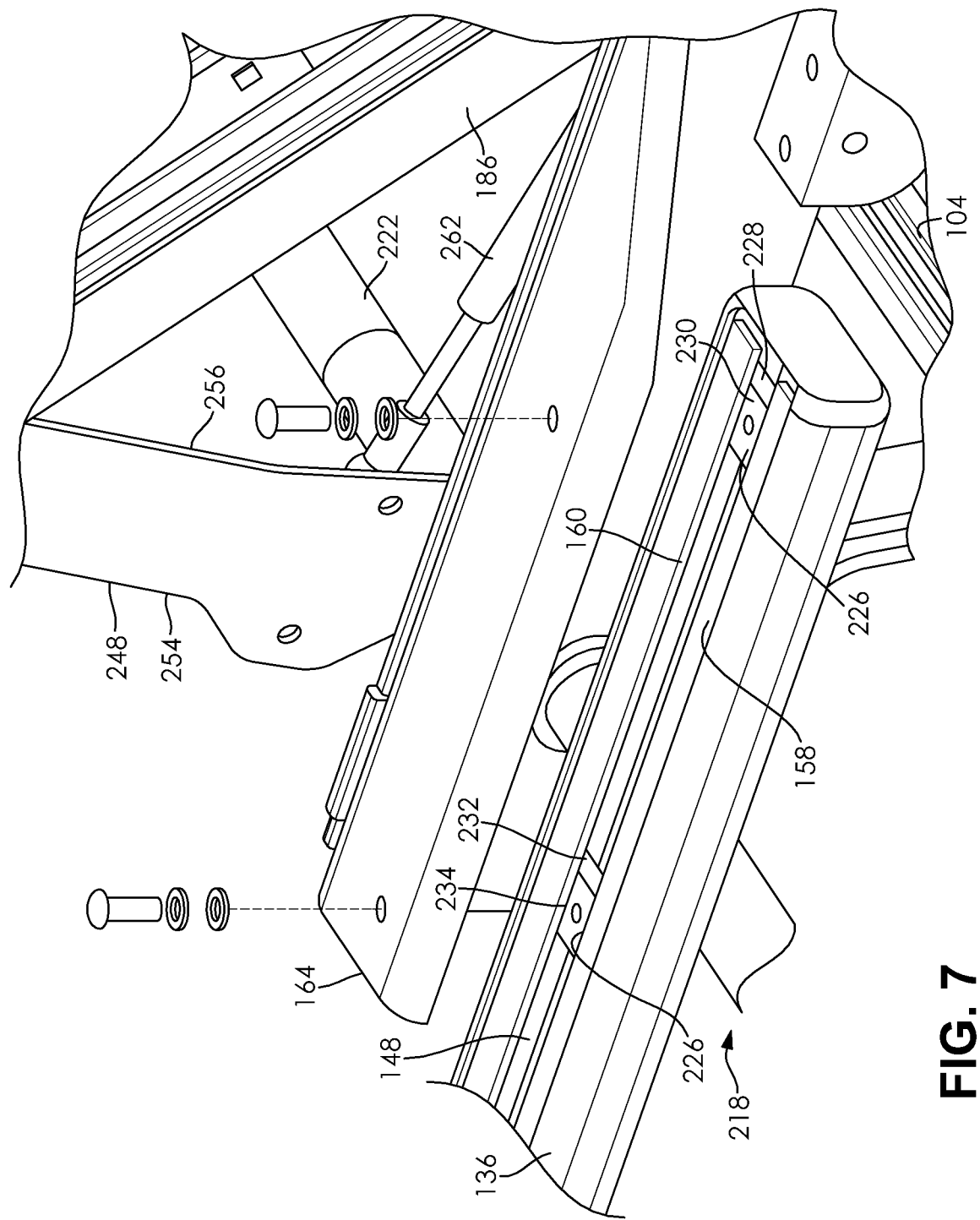
FIG. 7 depicts the ladder rack system in an extended and deployed condition and with certain components exploded.

Inserts 226 may be located in the upper channel 148 of the roof bow 136, as shown in FIG. 7. The inserts 226 may be generally T-shaped with a lower cross-bar 228 and a central stem 230 that may be located approximately mid-way on the cross-bar 228. The cross-bar 228 may fit under the upper flanges 158 and the lips 160 of the upper channel 148. In some embodiments, the cross-bar 228 may have upstanding ears 232 that fit between the lips 160 and the side walls 156. The central stem 230 may fit between the lips 160 or it may reside below the lips 160. Preferably, each insert 226 has an aperture 234 that may be aligned with one of the apertures 224 in the spanning flange 168.

The inserts 226 are sized and shaped to be selectively movable within the upper channel 148. In one embodiment, the inserts 226 may be positioned so their apertures 234 are aligned with the apertures 224 of the spanning flange 168. Fasteners (not shown) may be located through the apertures 224, 234 of the spanning flange 168 and the inserts 226 to secure the inserts 226 to the slides 164. The fasteners may be selectively tightened to fix the slide 164 with respect to the roof bow 136. Namely, when the fasteners are tightened, the insert 226 is drawn into fixing contact with the upper flanges 158, the lips 160 and/or the side walls 158 so that the insert 226, and thus the slide 164, does not move with respect to the upper channel 148.

The inserts 226, and thus the slides 164, may be fixed as noted above such as in the ship through inboard position, or the deployed outboard position. Of course, the connected slide 164 and inserts 226 can also be located anywhere in between these two conditions as the slide 164 and inserts 226 may selectively move between these two conditions.

In some cases, the roof bow mounting portion 126 may have a flat 238 attached to the riser 128. The flat 238 may be a planar structure that may extend parallel the lower channel 138. If a flat 238 is used, it may have an aperture 240 located therein adapted to receive the mechanical fastener 146. The mechanical fastener 146 can extend through the aperture 240 and into the flat 238 to selectively secure the fat 238 and thus the roof bow mounting portion 126 within the lower channel 138 and to the roof bow 136.

In some embodiments, the system 102 may provide for first and second slides 164—one on each roof bow 136. The two slides 164 may be substantially the same in their size, shape, construction and function. The slides 164, and the roof bows 136, may be constructed of the same or similar materials as noted above for the rails 104, 106 and the roof bow mounting portions 126.

In some embodiments, a pivot rod 222 may extend between the two slides 164. The pivot rod 222 may extend to each of the support flanges 166 of each slide 164. In one embodiment, the pivot rod 222 may extend through the support flange 166 of the first slide 164 and span the gap between the two roof bows 136 to connect with the support flange 166 of the second slide 164. The pivot rod 222 may be adapted to selectively move with the slides 164 when the slides 164 are moved, with respect to the roof bows 136, as mentioned above. While the pivot rod 222 is adapted to move with the slides 164, the pivot rod 222 may be mounted in a bushing 244, as shown in FIGS. 8, in the slide 164 that permits it to selectively rotate or pivot with respect to the slide 164. The pivot rod 222 may be located under the roof bows 136, which assists in minimizing the height of the system 102. The pivot rod 222 may extend generally parallel the rails 104, 106 and generally transverse the roof bows 136. The pivot rod 222 may be located in bushings 244 or the like in the support flanges 166 so that the pivot rod 222 can rotate with respect to the support flanges 166.

Figure 4:
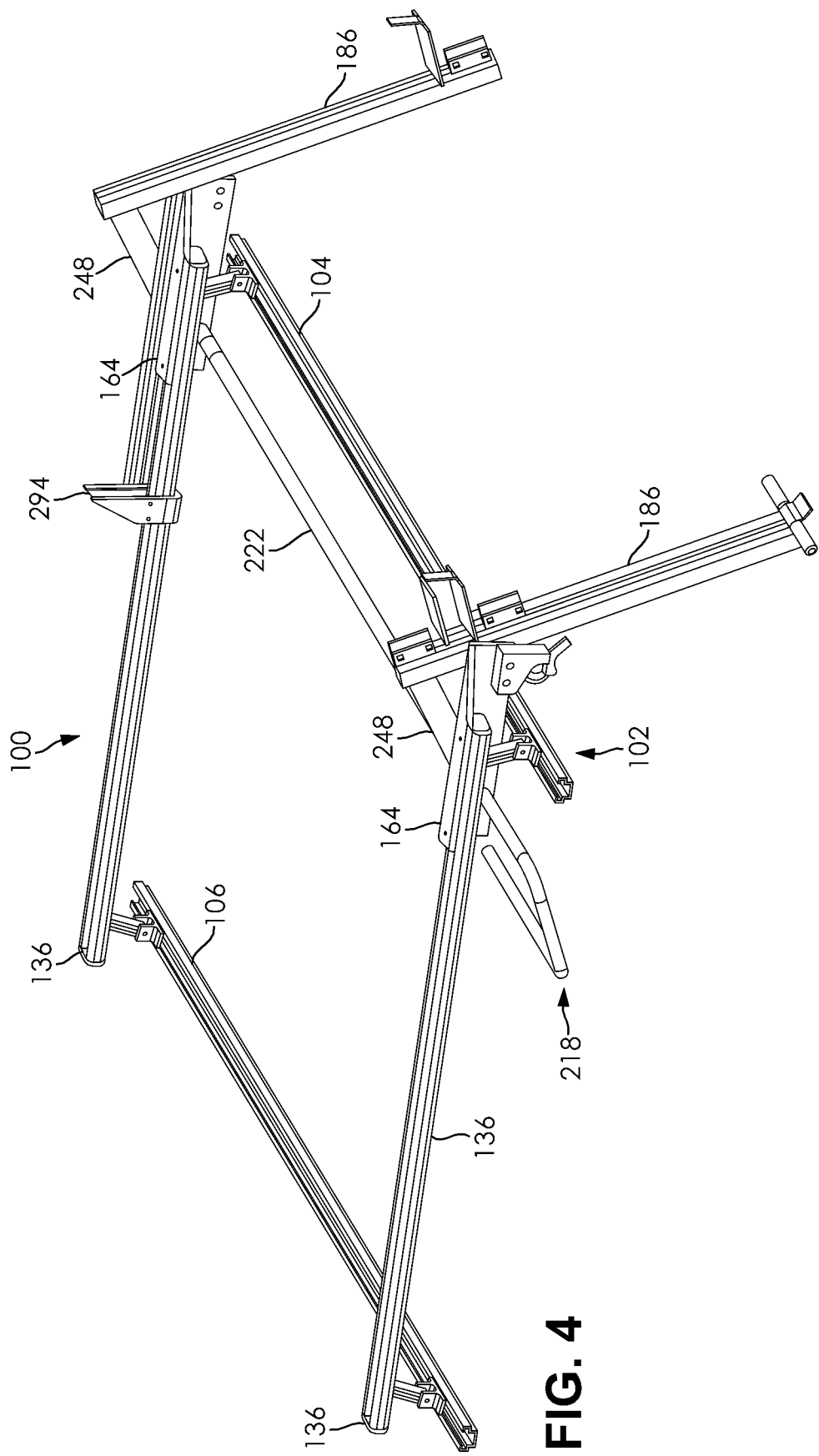
FIG. 4 depicts the ladder rack system from FIG. 1 in a deployed condition.
Figure 6:
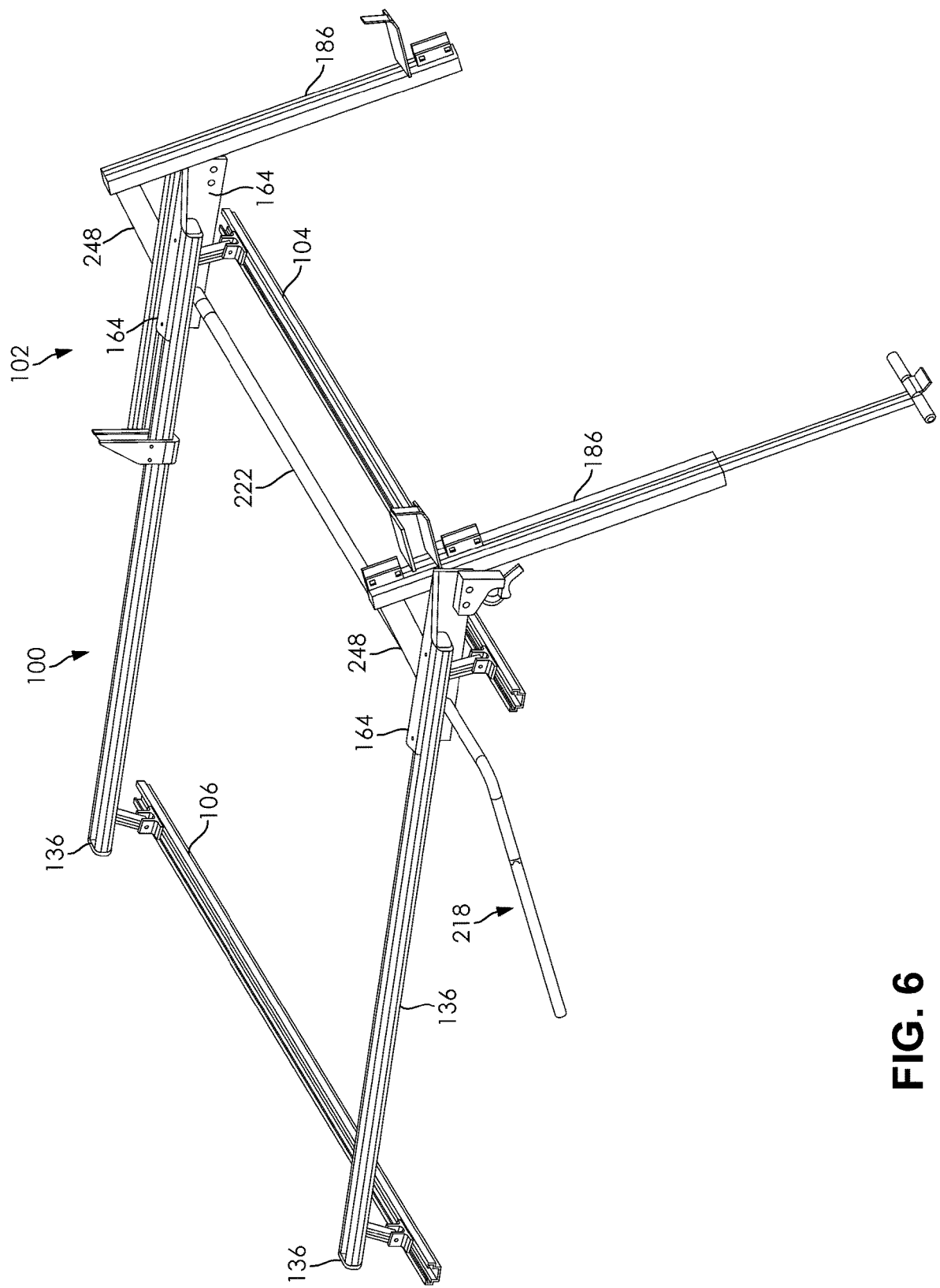
FIG. 6 depicts the ladder rack system from FIG. 4 in a deployed load or unload condition.

One end of the pivot rod 222 may be connected to a handle system 218, one embodiment of which is depicted in FIGS. 2, 4 and 6. The handle system 246 may be comprised of one or more parts that may be rotated, pivoted, and/or telescoped with respect to one another, or that they may be located adjacent, such as parallel one another, in order to save space. The parts may be unfolded, as shown in FIG. 6, to provide the handle system 218 with enough length that it may be more easily reached and operated by a user standing on the ground adjacent the vehicle. Other embodiments may permissibly include a handle system 218 that can be selectively removed and attached to the pivot rod 222.

Figure 3:
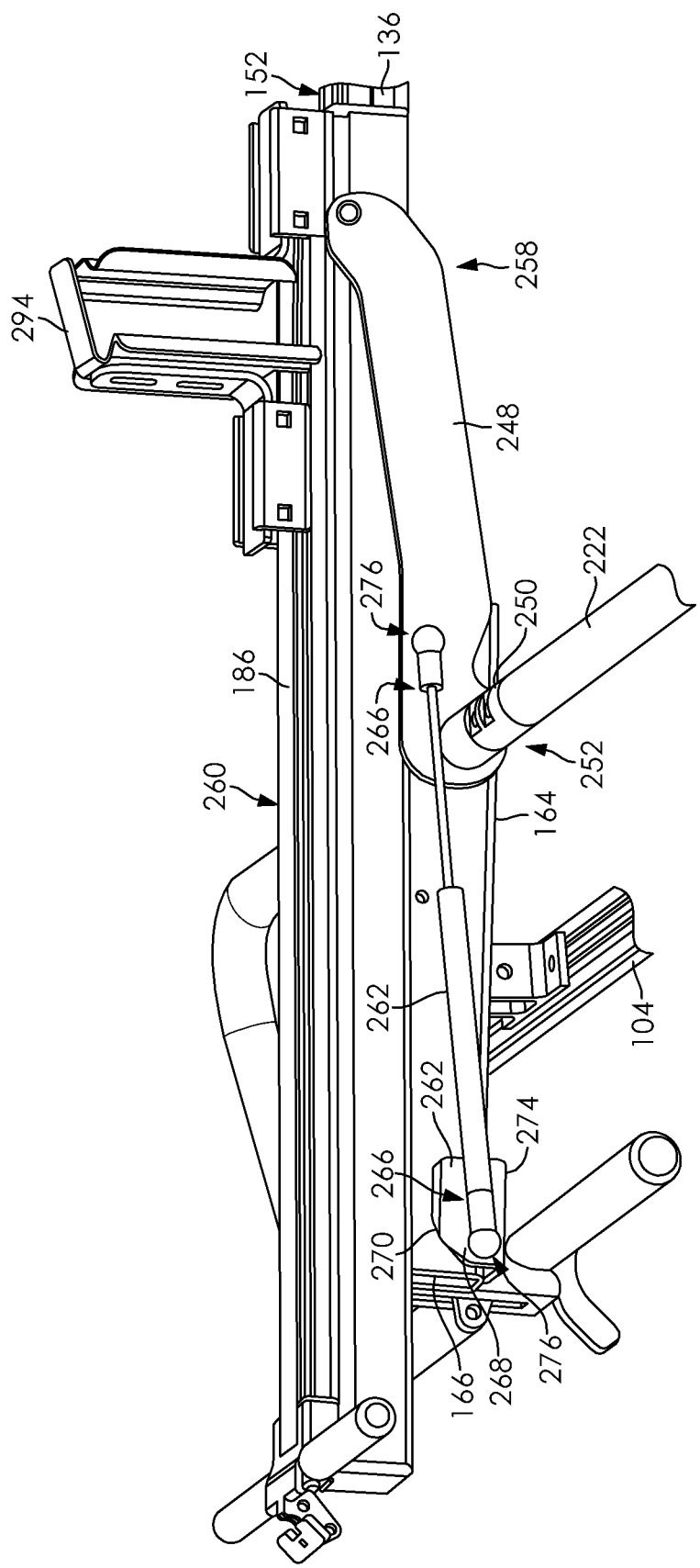
FIG. 3 depicts a portion of the ladder rack system from FIG. 2.
Figure 5:
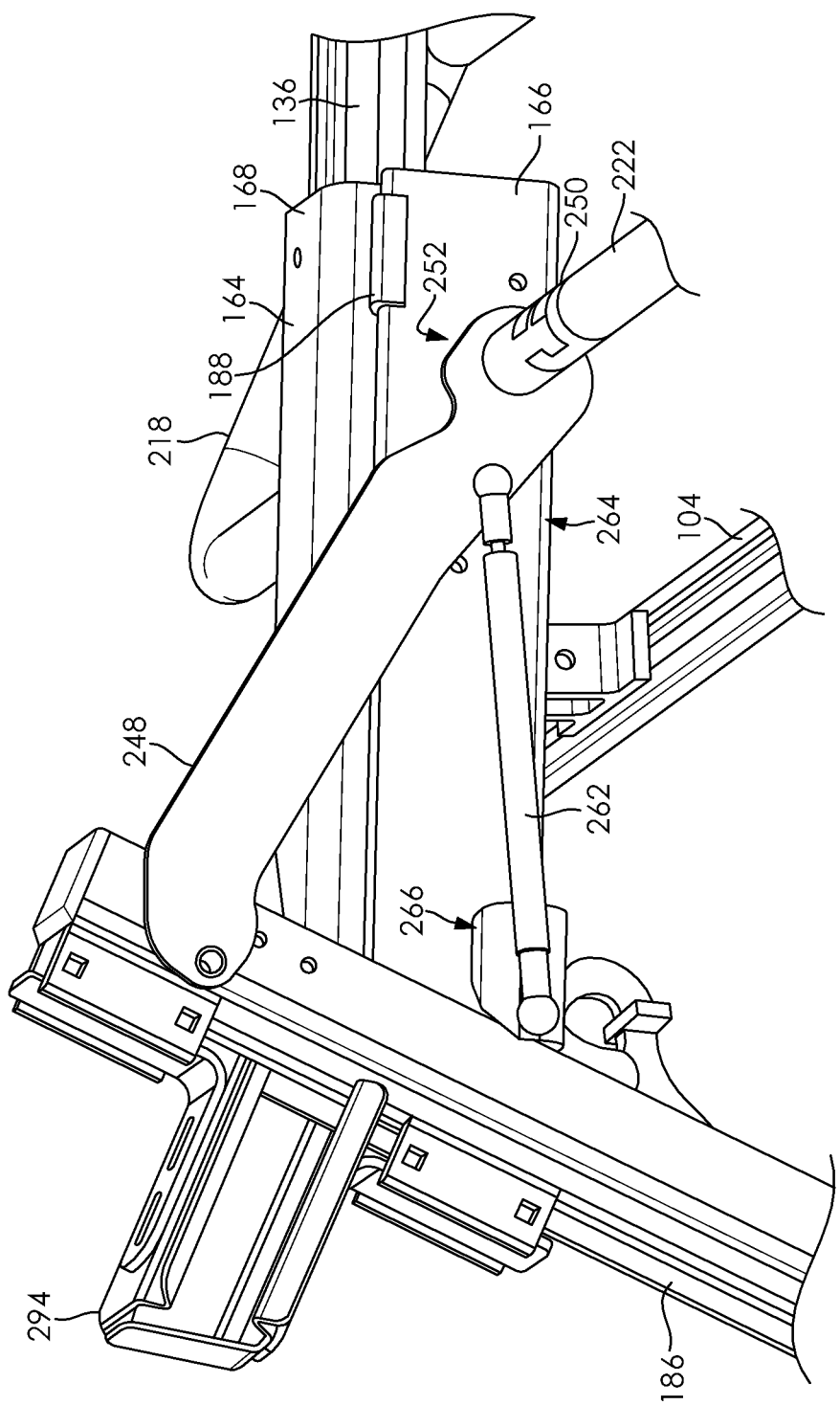
FIG. 5 depicts a portion of the ladder rack system from FIG. 4.

In some embodiments, the pivot rod 222 may be connected to a pivot bracket 248 as shown in FIGS. 3, 5 and 8. In such cases, it may be that the pivot rod 222 extends through the pivot bracket 248 and the two may be rotationally fixed to one another. By way of one example, a collar 250, from either the pivot rod 222, or the pivot bracket 248, may be used to connect the rod 222 with the bracket 248 in a rotationally fixed manner. In some embodiments, the pivot rod 222 may extend through a first end portion 252 of the pivot bracket 248, but other locations and connections may be possible.

In some cases, there may be a pivot bracket 248 associated with each slide 164. The pivot brackets 248 may be the same or substantially the same compared to one another. Some embodiments may have the pivot rod 222 extending through first end portions 252 of both pivot brackets 248 described above.

In some conditions, at least part of each pivot bracket 248 may be located adjacent its respective slide 164, such as adjacent the support flange 166 of the slide 164. The pivot bracket 248 may be substantially plate-like in its construction, with a first side 254 and a second side 256. The first side 254 may face the support flange 166 of the slide 164, while the second side 256 is located opposite the first side 254. The first side 254, which may be substantially planar, may be parallel, but separated from, the support flange 166 by a gap. In some embodiments, the pivot bracket 248 may have a general, in whole or in part, an S-shape or a J-shape The pivot bracket 248 may also have a second end portion 258, opposite the first end portion 252. The second end portion 258 may be connected to the ladder support member 186. The connection between the second end portion 258 and the ladder support member 186 may be such as a pivotal motion or one in which the second end portion 258 or the ladder support member 186 may move with respect to one another. In one embodiment, the pivotal motion may be such as through a fastener or stud that connects both the pivot bracket 248 and the ladder support member 186.

In the ship through and extended conditions, the pivot bracket 248 may be located inboard from the rails 104, 106, which may be appreciated in FIG. 3. In these same conditions, the pivot bracket 248 may have its first end portion 252 closer to the rail 104 or 106, while its second end portion 258 is located further from the rail 104 or 106. In these same conditions, the majority, if not all, of the pivot bracket 248 may be located below an upper surface 260 of the ladder support member 220. This configuration reduces the height of the system 102. The pivot bracket 248 may be substantially parallel the second wall 172 of the support flange 166 in this condition.

In some embodiments, the first and second end portions 252, 258 of the pivot brackets 248 may be both located below the plane of the upper surface 152 of the roof bow 136. The end portions 252, 258 of the pivot brackets 248 may reside below the plane of the upper surface 152 of the roof bow 136 in the ship, deployed and extended conditions.

A biasing member 262 may be attached to just one, or each, pivot bracket 248 and the ladder support member 186 or the slide 164. In one embodiment, a first end portion 264 of the biasing member 262 may be connected to the first end portion 252 of the pivot bracket 248. A second end portion 266 of the biasing member 262 may be connected to either the ladder support member 220 or the slide 164 (or components associated with either), such as the support flange 166 of the slide 164.

In some embodiments, the second end portion 266 may be connected to a biasing member bracket 268. The biasing member bracket 268 may be one piece, integrally formed and unitary with the support flange 166, or it may be separately formed and attached to the support flange 166 such as through welding or the like.

The biasing member bracket 268 may have an upper wall 270, an outer wall 272 and a lower wall 274 as shown in one embodiment in FIGS. 3, 5 and 8. The walls 270, 272, 274 may be formed in a generally C-shaped cross section where the outer wall 272 may be substantially parallel the second wall 172 of the support flange 166, but separated therefrom by the upper and lower walls 270, 274. Further, the outer wall 272 may be separated from the second wall 172 by a gap, or open space, created by the outer wall 272 being located at the ends of the upper and lower walls 270, 274.

The biasing mounting bracket 268 may be located on an outboard portion of the support flange 166, opposite the connection of the pivot rod 222 with the support flange 166 at an inboard portion thereof.

The first and second end portions of 264, 266 the biasing member 262 may be connected as noted above such as through ball-type mounts 276 to permit relative movement, such as pivotal or rotational movement, between the biasing member 262 and the components they are connected to. Being so mounted, it may be preferred that the biasing member 262 itself does not rotate or pivot in a substantial way during operation of the rack system 102.

In some embodiments, the biasing member 262 may extend generally parallel with the ladder support member 220 and/or the slide 164 in both the deployed and extended conditions, and during use. In other cases, the biasing member 262 may have an angle with respect to the horizontal, such as between 10-30 degrees. In such cases, the second end portion 266 of the biasing member 262 may be positioned lower than the first end portion 264 such that the second end portion 266 is vertically closer to a rail 104, 106 than the first end portion 264. In all instances, the biasing member 262 may extend above and across the rail 104, 106.

The biasing member 262 may be such as a fluid piston/ cylinder combination that resists the movement of the ladder support member 220 as it pivots downwardly and away from the slide 164 during a deployed condition. In other embodiments, the biasing member 262 may resist the movement of the ladder support member 220 as it pivots upwardly and toward the slide 164 to reach an extended condition. The biasing member 262 may also be such as a one or more springs including compression, extension, torsion, constant force, draw bar, volute, gas and/or air springs, or other spring apparatus.

As may be best appreciated from FIGS. 8, the ladder support member 186 may be comprised of an upper member 278 and a lower member 280. In some embodiments, the second end portion 258 of the pivot bracket 248 may be connected to the lower member 280. The connection may be such as a pivotal connection and the connection may be adjacent a rear, or inboard, portion of the lower member 280.

The upper and lower members 278, 280 may be selectively moveable with respect to one another. In one embodiment, the two members 278, 280 may be selectively moveable with respect to one another along an axis 282 of the ladder support member 180. In such an embodiment, the upper member 278 may move along, such as slide along, at least a portion of the lower member 280.

In some embodiments, the upper member 278 may at least partially overlap the lower member 280. In such embodiments, the upper and/or lower members 278, 280 may have respective channels 284, and flanges 286 within the channels 284, that prevent them from being vertically separated but which permit relative movement (such as to and from the extended position), one embodiment of which may be seen in FIG. 8. Additionally, bearings, bushings, gliding blocks and/or other friction reducing devices, may be used to facilitate movement between the two members 278, 280.

The lower member 280 may have a second wall receiving channel 288. The second wall receiving channel 288 may extend the length of the lower member 280 or only a portion thereof. The second wall receiving channel 288 may extend substantially continuously with the same cross-sectional shape. The second wall receiving channel 288 may selectively receive at least a portion of the second wall 172 of the slide 164 therein, as can be appreciated from FIGS. 8 and 9. Further, the channel 288 may receive the rollers 180 mounted on the second wall 172 to facilitate relative movement of the ladder support member 180 with respect to the slide 164. The rollers 180 are captured within the channel 288 and may move along lands 290 formed in the lower member 280, such as the second wall receiving channel 288.

In some embodiments, at least the upper portion 184 of the second wall 172 may be located within the second wall receiving channel 288, such as in the ship through and/or in the extended condition. In such an embodiment, the upper portion 184 of the second wall receiving portion 288 may be located along its length within the second wall receiving channel 288. In a deployed condition, only the outboard end portion 182 of the second wall 172 may be located within the receiving channel 288, as shown in FIG. 8.

In some embodiments, a second resilient member 292 may be located within the second wall receiving channel 288. In some cases, the resilient member 292 may be captured within the channel 288. The resilient member 292 may be such as a block that aligns with the first resilient 188 member for the second wall 172 when the ladder support member 220 is lowered onto the second wall 172. The resilient members 188, 292 may contact one another when the ladder support member 220 is lowered onto the second wall 172 to provide a cushion between the ladder support member 220 and the second wall 172. The second resilient member 292 in the channel 288 may otherwise be as the first resilient member 292 described above for the second wall 172 at least in terms of material.

The second resilient member 292 located within the channel 288 may also function as a stop for the ladder support member 220. Namely, in some embodiments, the second resilient member 292 may be fixedly secured within the channel 288, such as by mechanical fasteners, adhesives and/or other structures. When the ladder support member 220 is being lowered (as described additionally below), the ladder support member 220 moves along the second wall 172 and the rollers 180. The second resilient member 292 will come in contact with the rollers 180 at a predetermined location on the path of the ladder support member 220. The second resilient member 292 will prevent the ladder support member 220 from moving any further along the lower channel 288 and will hold the ladder support member 220 in a fixed position.

The second resilient member 292 may also be such as a spring or biasing member, such as described above. The second resilient member 292 may function as a shock absorber to absorb or resist impact between the second wall 172 and the ladder support member 220 when the ladder support member 220 moves to the lowered or deployed condition.

The upper member 278 may be selectively released from, and then locked to, the lower member 280. In one embodiment, a release device, which may be such as the handle 218, may be located at a forward, or outboard, portion of the upper member 278. The handle 218 may be moved to release a latch (not shown) within the ladder support member 220 so that the upper member 278 may move with respect to the lower member 280.

In such an embodiment, the upper member 278 may be lowered toward the ground to make adding/removing a ladder easier for the operator. Conversely, when the upper member 278 should be retracted with respect to the lower member 280, the handle 218 may be moved to release the latch, and the upper member 278 can be pushed back into its substantially overlapping relationship with the lower member 280.

In some embodiments, ladder lockers 294 may be selectively located on each of the upper members 278. The ladder lockers 294 may be the same between the ladder support members 186 or they may be different. The ladder lockers 294 capture a ladder (not shown) and selectively secure the ladder to the system 102.

The ladder lockers 294 may be removed from the ladder support members 220 to minimize the height of the system 102 during the ship through condition. The ladder lockers 294 may be selectively moved along the upper member 298 such as, by example, their engagement with grooved in the upper member 278. The ladder lockers 294 may have fingers that engage with the grooves on the upper member 278 that permit selective movement along the locker upper member 278. The ladder lockers 294 may be removed from the upper member 278 by sliding them off the front or back of the member 278. The system 102 without with ladder lockers 294 is shown in FIG. 1.

From FIGS. 4 and 5, which depict the extended and deployed position, it can be appreciated that each ladder support member 220 may be adapted for pivotal or rotational motion with respect to its respective slide 164. In this condition, the pivot rod 222 has rotated the pivot brackets 248 approximately 110-150 degrees from their ship through to the deployed and/or extended conditions. The action has compressed the biasing member 262, which has otherwise remained in its position. The ladder support member 220 is now at an obtuse angle (measured from the upper surface 152 of the roof bow 136 to the upper surface 260 of the ladder support member 220). In this condition, a ladder can be added to or removed from the ladder support member 220.

The ladder support member 220 can be returned to the ship through and extended conditions by reversing the motion. In the ship through and extended conditions the ladder support member 220 may be located directly adjacent, such as beside, the slide 164. In some embodiments, the ladder support member 220 may be parallel the support flange 166. The upper surface 260 of the ladder support member 220 in the ship through and extended conditions may be at the same height at the upper surface 202 of the spanning flange 168, or slightly above it. In this condition, the height of the system 102 may be minimized.

Turning now to FIGS. 11-20, another embodiment of the ladder rack system 296 is schematically depicted. The ladder rack system 296 in these figures may be the same, or substantially the same, as described above and depicted in FIGS. 1-10, except as noted below. Thus, the same nomenclature will be used, including continued use of the article "the" for features that have already been introduced.

The ladder rack system 296 in FIGS. 11-20 may be such as a double rack where the same, or substantially the same, features are located on both the driver/street side 298 and the passenger/curb side 300 of the vehicle/rack. From all the figures in the application then it can be readily appreciated that the system 102 in FIGS. 11-20 may be converted to a double rack system 296, and the system 296 in FIGS. 11-20 may be converted to a single rack system 102.

Figure 11:
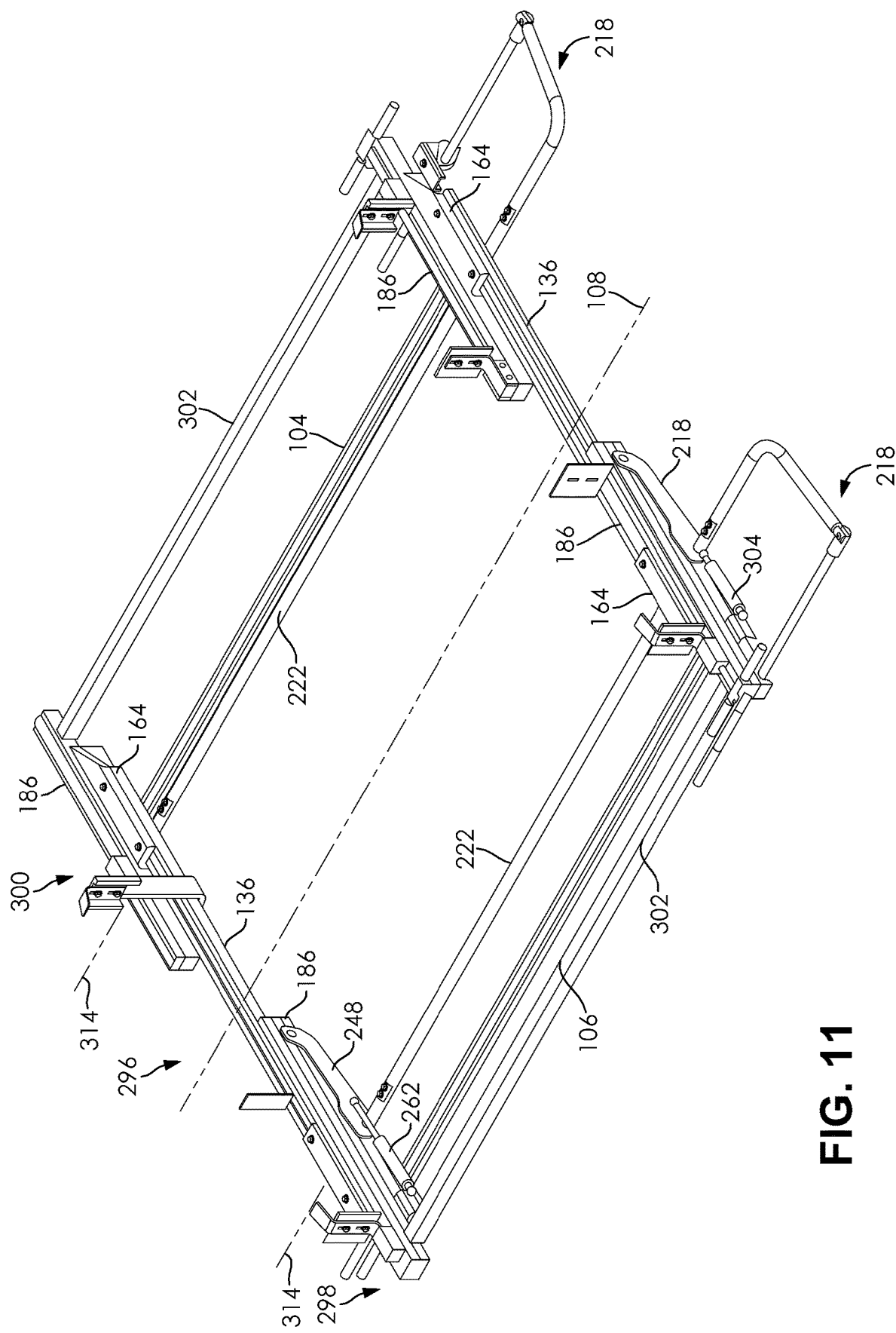
FIG. 11 depicts an upper perspective view of another embodiment of a ladder rack system for a vehicle in a ship through condition.
Figure 12:
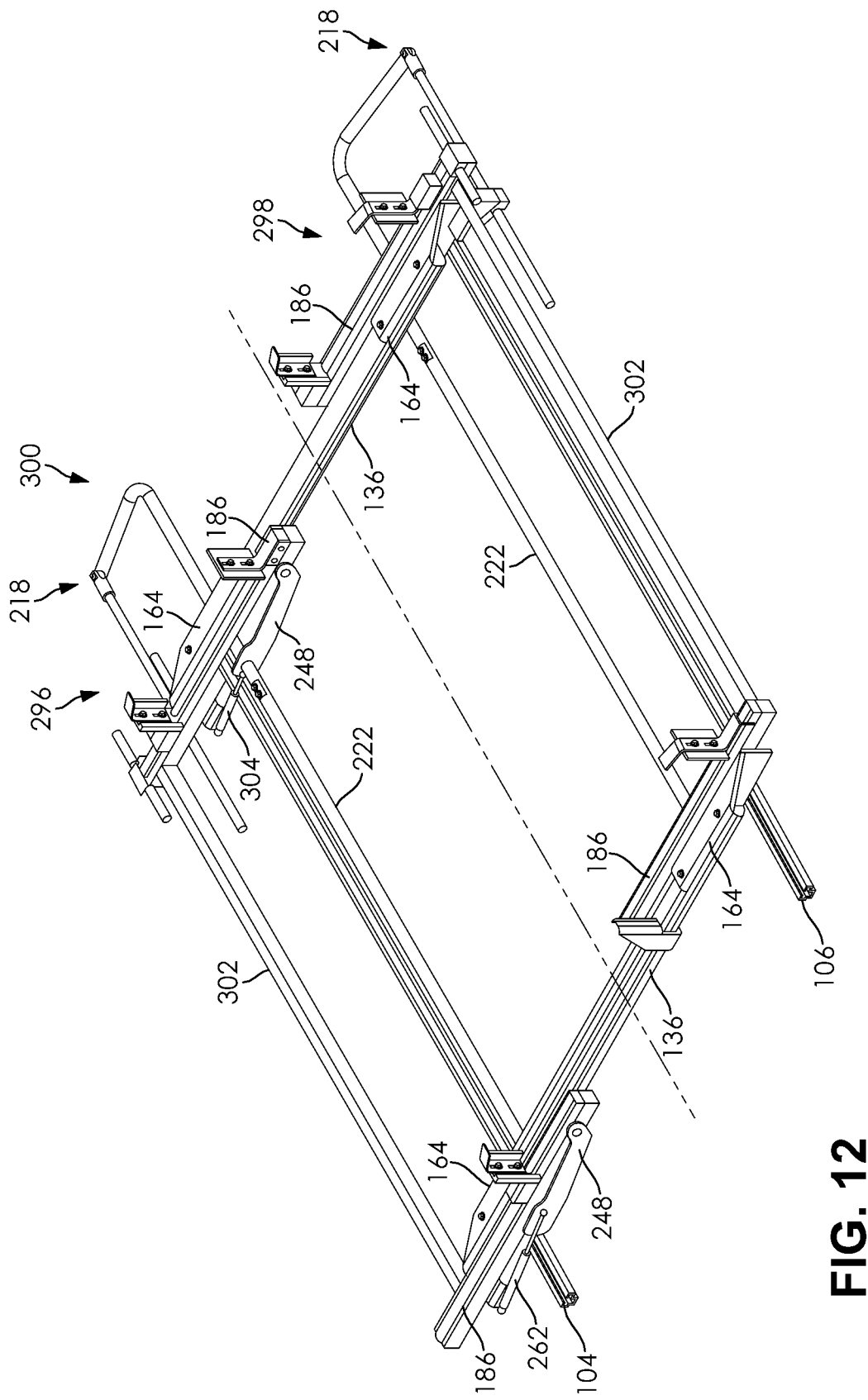
FIG. 12 depicts the ladder rack system from FIG. 10 in an extended or operating condition.

FIG. 11 depicts the system 296 in the ship through condition, which can be readily appreciated from the information above. FIG. 12 depicts the system 296 in the extended or operating condition, which can also be readily appreciated from the information above.

FIGS. 11 and 12 depict a support bar 302 that connects and extends between the ladder support members 186. In this embodiment, a support bar 302 may extend between each support member 186 on each side of the system 296. In other cases, it may be that only a single support-bar 302 is needed for the entire system 296. The support bar 302 may be connected to the ladder support members 186 such as with mechanical fasteners or the like. The support bar 302 spans between the ladder support members 186, connecting them, to support and stabilize the ladder support members 186, as well as the system 296, particularly during movement of the system 296.

FIGS. 11-20 also depict the embodiment where a second biasing member 304 has been added. The second biasing member 304 may be such as a gas spring. A gas spring may use a compressed fluid, such as a gas, that is contained within an enclosed sealed cylinder having a sliding piston therein to pneumatically store potential energy and provide a force applied generally parallel to the orientation of a shaft connected to the piston. The gas spring may be such as a standard cylinder, a fixed height cylinder, a spindle only, a cable cylinder, a stage cylinder, a non-rotating cylinder, a return cylinder, an auto return cylinder with height adjustment, a bouncing cylinder, a dual mode cylinder, and/or an oil damper.

While a gas spring is mentioned, the second biasing member 304 may be other structures as well, or in addition. For example, the second biasing member 304 may be such as a coil spring having one end connected to the pivot bracket 248 and another end connected to the support flange 166 or directly attached to or adjacent a pivot point or rotation point, such as the pivot rod 222.

The gas spring may have a first end portion 306 and a second end portion 308. In the depicted embodiment, the first end portion 306 may be connected to the pivot bracket 248. In some embodiments, the first end portion 306 may be connected to the first end portion 252 of the pivot bracket 248. The first end portion 306 of the gas spring may be fitted with a ball joint component 310. In the depicted embodiment, the component 310 may be such as a socket, while a ball portion 312 is connected to the pivot bracket 248. The components 310, 312 permits pivotal or rotational motion of the pivot bracket 248 with respect to the gas spring. While a ball joint is mentioned, other connections may be used including connections that use mechanical fasteners.

Figure 13:
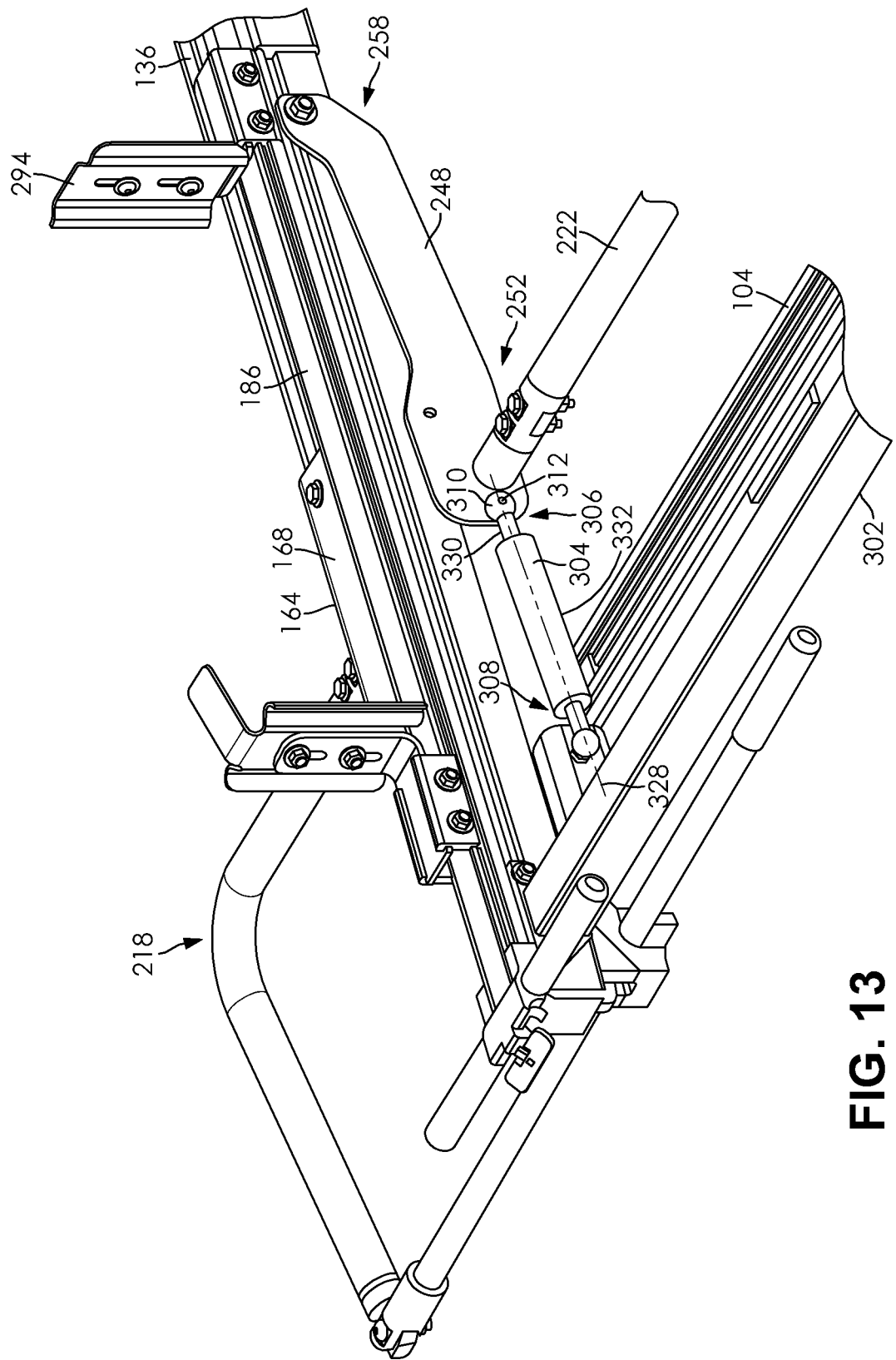
FIG. 13 depicts a portion of the ladder rack system from FIG. 11.

FIG. 13 depicts the system 296 in an operating condition, but the system 296 has not been deployed. In such a condition, the ball 312 on the pivot bracket 248 may be located at, or adjacent, the height of the pivot rod 222 including the height of an axis 314 of the pivot rod 222. The height of the pivot rod axis 314 and the height of the ball 312 may be measured from a bottom surface 316 of the support flange 166. The ball 312 on the pivot bracket 248, again in the extended but not deployed condition, may also be located outboard from the pivot rod axis 314.

In such a condition, the attachment point for the first end portion 306 of the second biasing member 304 at the pivot bracket 248, which may be the ball 312 on the pivot bracket 248, and thus also the first end portion 306 of the second biasing member 304, may be located below an upper edge 318 of the second wall 172 and below the upper surface 202 of the spanning flange 166. Further, the ball 312 on the pivot bracket 248, and thus the first end portion 306 of the second biasing member 304, is located above and inboard of the rail 104 or 106.

The second end portion 308 of the second biasing member 304 may be connected to the support flange 166. As shown in the depicted embodiment, the second end portion 308 of the second biasing member 304 may be connected to the second wall 172 of the support flange 166, such as at a lower, outboard portion 320 of the second wall 172.

In some embodiments, the second end portion 308 may be connected to a biasing member bracket 248 connected to the second wall 172. The second end portion 308 may be connected to an outer wall 272 of the bracket 248 with a ball type joint 322, such as described above. The ball 324 of the joint 322 may be connected to the outer wall 272, and the socket 326 of the joint 322 may be part of the second end portion 308 of the second biasing member 304.

As noted above, FIG. 13 depicts the system 296 in an extended or operating condition, but the system 296 has not been deployed. In such a condition, the ball 324 on the outer wall 272, of a biasing member bracket 268 may be located at, or adjacent, the height of the ball 312 on the pivot bracket 248. In some embodiments, the ball 324 on the outer wall 272 may be slightly lower than the ball 312 on the pivot bracket 248. In these cases, the second biasing member 304 may have a longitudinal axis 328 that extends at a slight incline from the outer wall ball 324 to the pivot bracket ball 312, which may be more easily seen in FIG. 14. The incline may be on the order of 1-15 degrees, including 5-10 degrees.

In such a condition, the ball 324 on the outer wall 272, and thus the second end portion 308 of the second biasing member 304, may be located below the upper edge 312 of the second wall 172 and below the upper surface 202 of the spanning flange 168. Further, the ball 324 on the outer wall 272, and thus the second end portion 308 of the second biasing member 304, may be located above and outboard of the rail 104 or 106.

Figure 16:
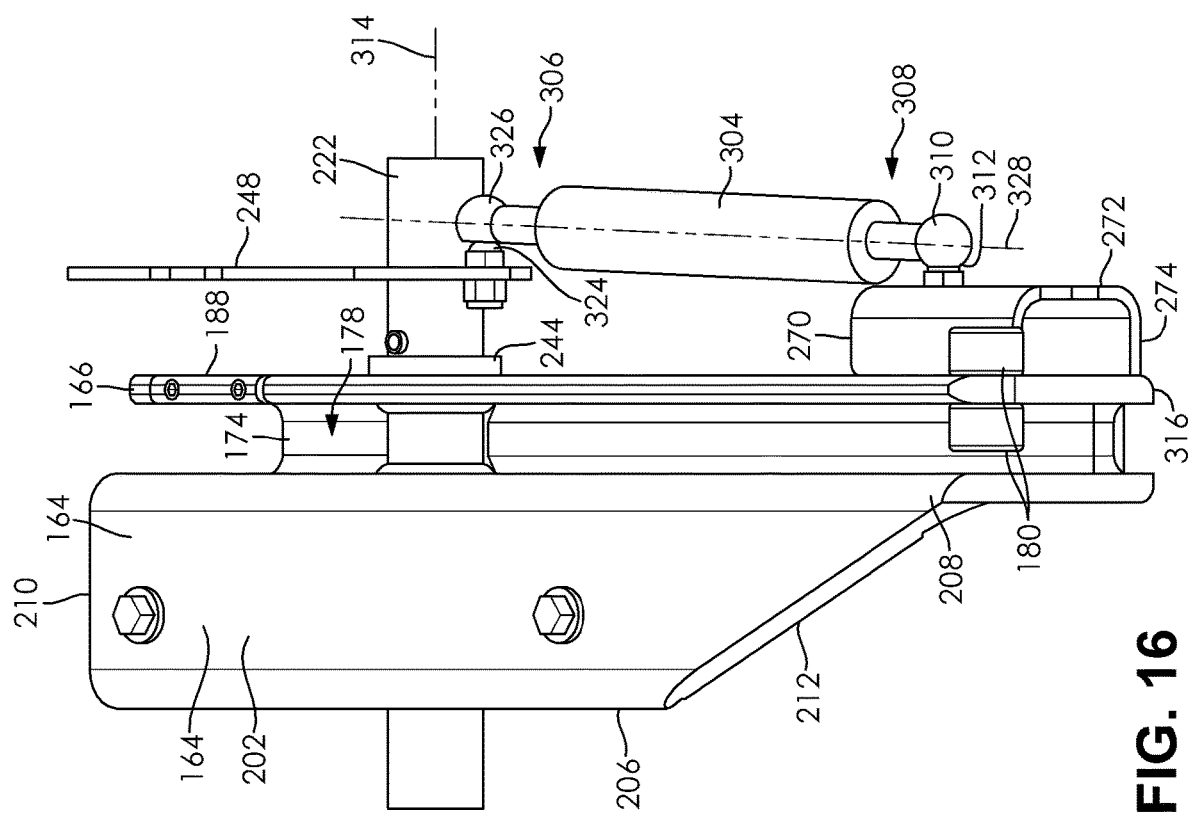
FIG. 16 depicts a portion of the ladder rack system from FIG. 11.
Figure 17:
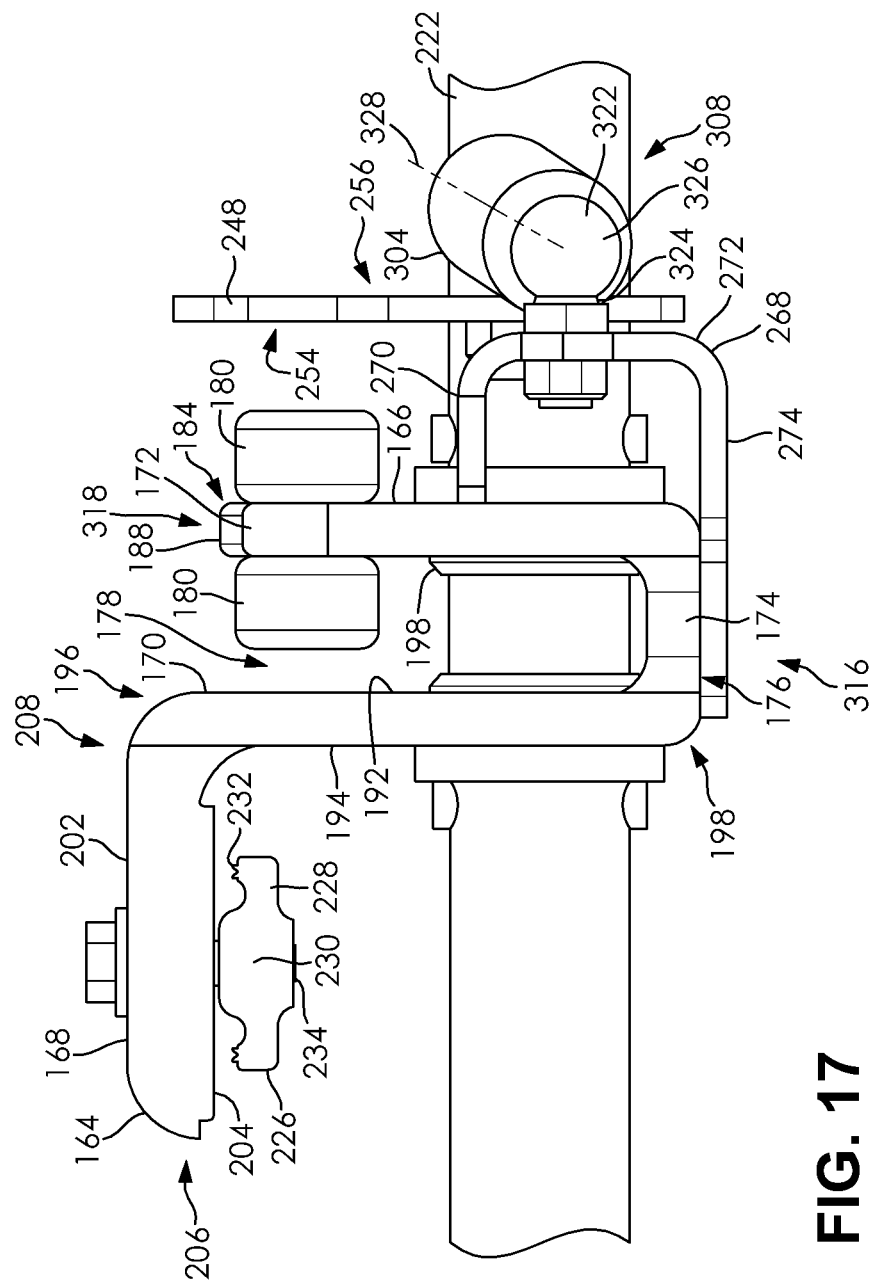
FIG. 17 depicts a portion of the ladder rack system from FIG. 11.

With further reference to the extended but not deployed condition, and with reference to FIGS. 16 and 17, it can be seen that in some embodiments, the longitudinal axis 328 of the second biasing member 304 may not be parallel the second wall 172. Instead, the longitudinal axis 328 may be angled such that from connection at the biasing member bracket 268 to the pivot bracket 248 the angle increases. The angle may be such as between 1 and 15 degrees, including 5-10 degrees. Even with an angle, particularly with a slight angle, the second biasing member 304 may be connected to the pivot bracket 248 so that it extends substantially coplanar with the pivot rod 222, but the second biasing member 304 may extend substantially transverse to the pivot rod 222. From these figures and others, it can be appreciated that in some embodiments, the second biasing member 304 is substantially parallel the ladder support member 220 and located below the spanning flange 168.

Figure 18:
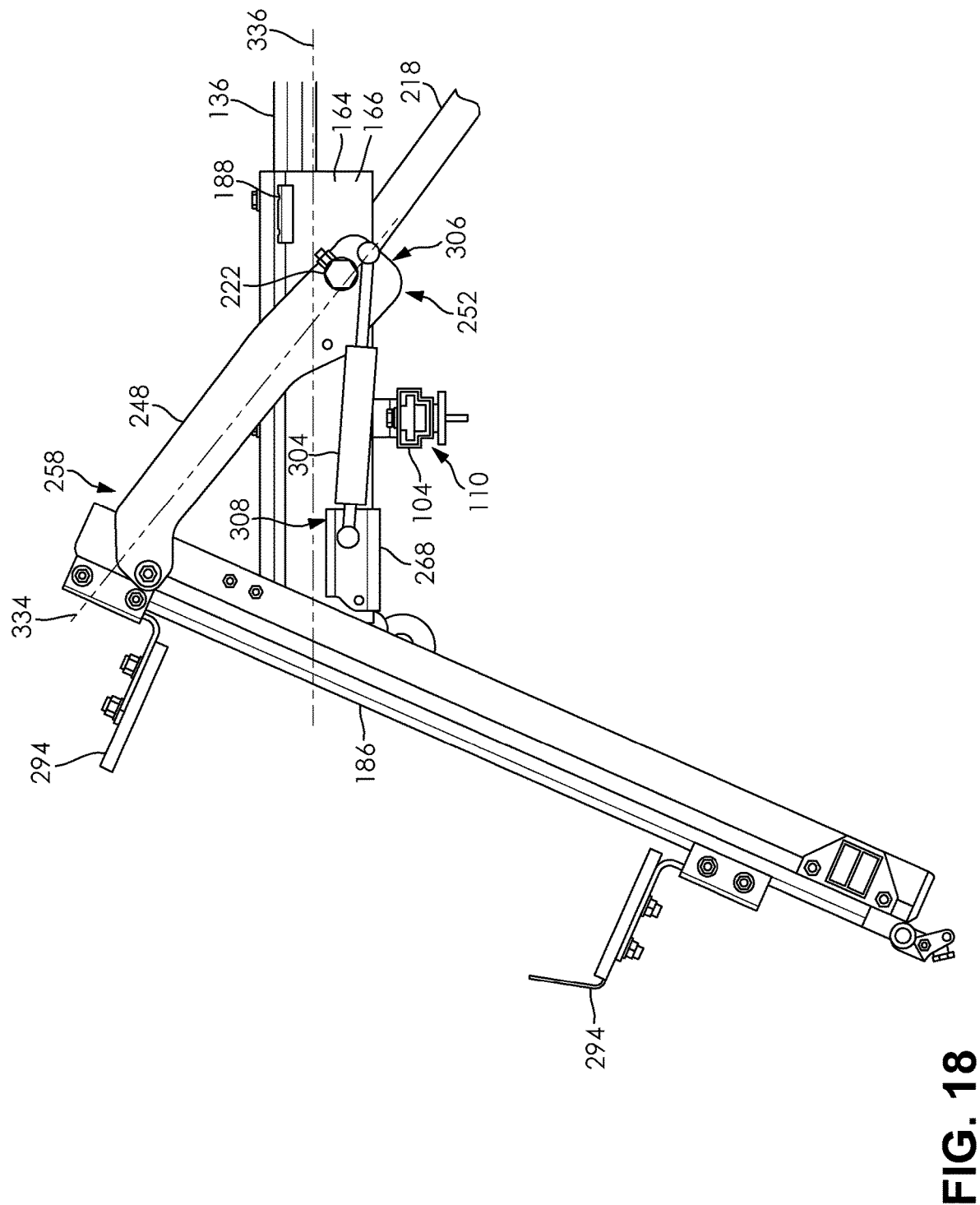
FIG. 18 depicts a portion of the ladder rack system from FIG. 11.
Figure 19:
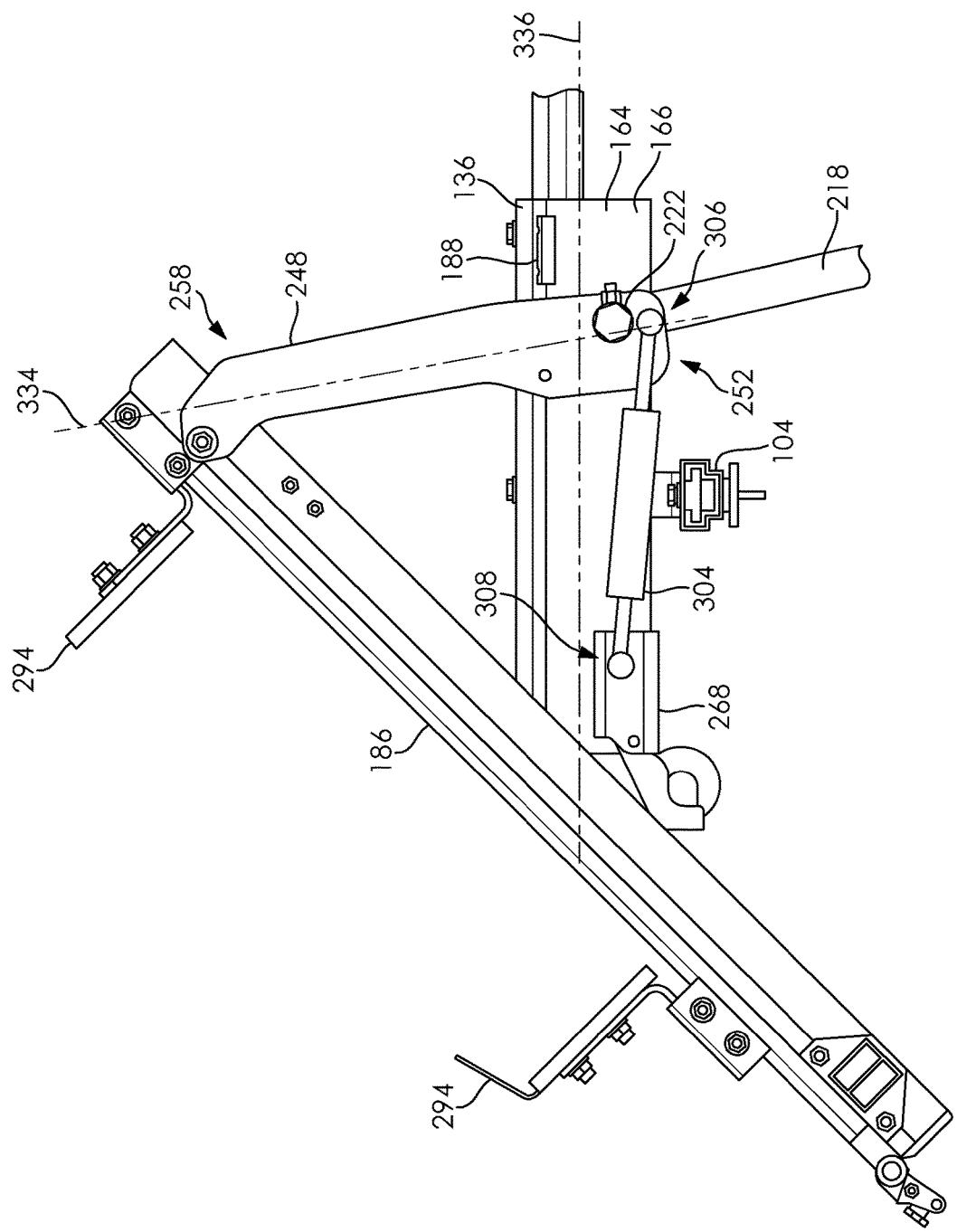
FIG. 19 depicts a portion of the ladder rack system from FIG. 11.
Figure 20:
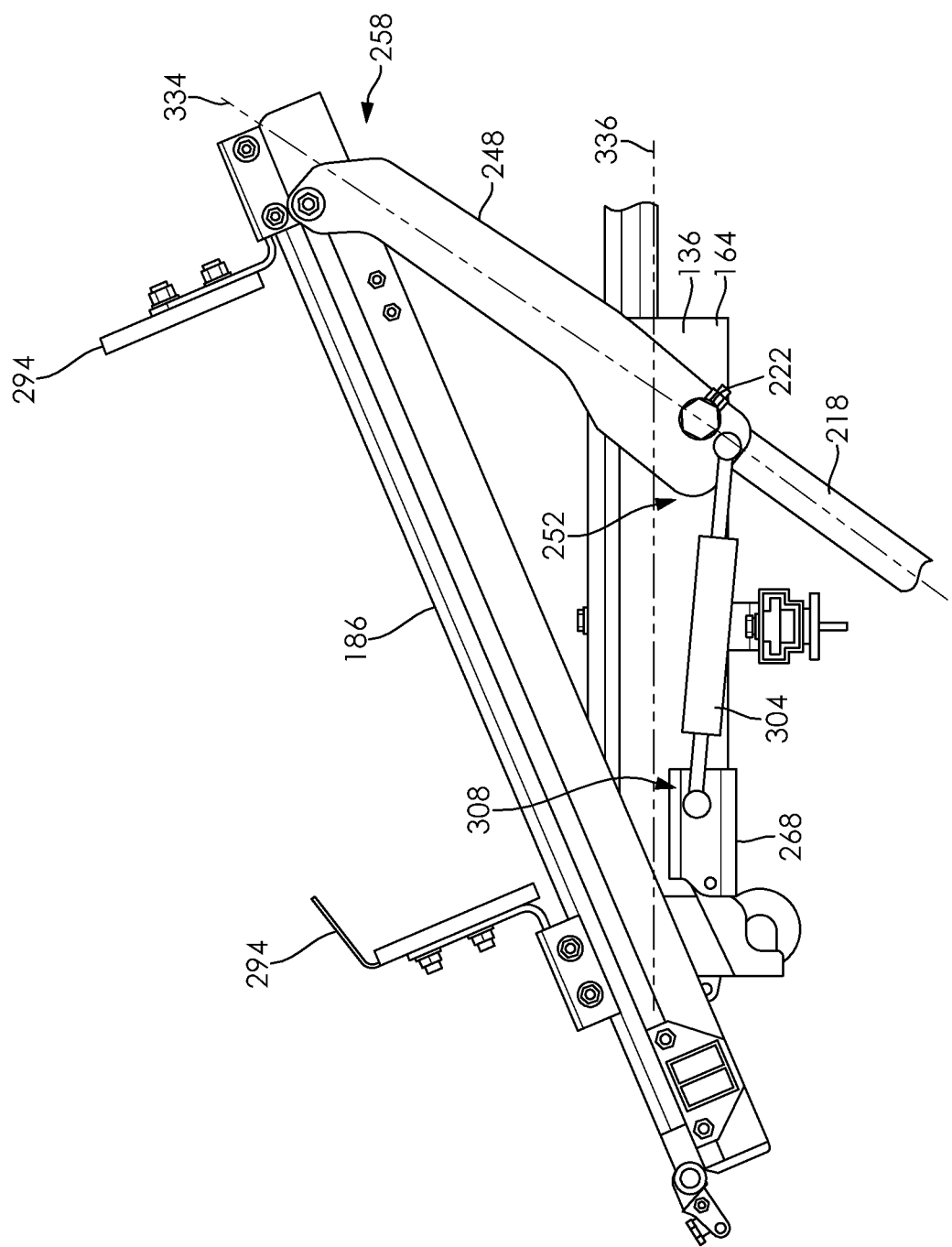
FIG. 20 depicts a portion of the ladder rack system from FIG. 11.

FIGS. 18-20 depict the system 296 in various states of the deployed and also extended conditions. FIG. 18 depicts one embodiment where the system 296 may be in the fully deployed position. In this condition, the pivot rod 222 may be fully rotated, which in turn has fully rotated the connected pivot bracket 248. The pivot bracket 248, and thus the ladder support member 220, may be located at its greatest angle with respect to the horizontal upper surface 202 spanning flange 168. The pivot bracket 248 may be located at an obtuse angle with respect to the upper surface 202 of the spanning flange 168. The first end portion 306 of the second biasing member 304, where it is connected to the pivot bracket 248, has moved to a position both under and inboard of the axis 314 for the pivot rod 222. The piston rod 330 of the second biasing member 304 is fully, or at least substantially, extended from its housing 332. Thus, at least a portion of the piston rod 330 may be located under and inboard of the axis 314 for the pivot rod 222. The second biasing member 304 is positioned to provide a generally linearly directed pulling force in the outboard direction to cause, or facilitate, a clockwise rotation of the pivot bracket 248 about its rotational_point, which is coincident with the pivot rod axis 314.

FIG. 19 depicts the system 296 in a condition where the pivot bracket 248 has rotated further in the clockwise direction and is now in an orientation substantially or generally transverse the support flange 166. In other words, a major axis 334 of the pivot bracket 248 is now transverse to a major axis 336 of the support flange 166. In this condition, the first end portion 306 of the second biasing member 304, with the ball joint 310, 312, has now moved to a location below the axis 314 of the pivot rod 222. A vertical line may now extend through the first end portion 306 of the second biasing member 304 and the pivot rod 222. Compared to FIG. 18, the piston rod 330 of the second biasing member 304 has retracted into the housing 332 and continues to provide an outwardly directed force, such as a pulling force, on the first end portion 252 of the pivot bracket 248 thus continuing to urge the pivot bracket 248 to rotate about the pivot rod 222 in a clockwise direction.

In FIG. 20, the pivot rod 222 has been rotated further, resulting in the pivot bracket 248 forming an acute angle with the upper portion 150 of the roof bow 136. The ball joint 322 on the second end portion 258 of the pivot bracket 248 has now moved or rotated further and is now emerging on the outboard side from under the pivot rod 222. Further, the piston rod 330 in the second biasing member 304 has generally linearly retracted further into the housing 332 to continue to provide a constant pulling force on the pivot bracket 248. The pulling force continues until the ladder support member 186 comes to rest against the second wall 170 of the support flange 166.

Note that during the rotation of the pivot bracket 248, such as described above, the second end portion 308 of the second biasing member 304 makes no substantial movements, except for the ball 324 to move within the socket 326.

It can be appreciated from the foregoing that the second biasing member 304 reduces the force an operator must exert in order to move the ladder support member 186 from the extended condition off of the vehicle to a rest position on the vehicle. The object the operator may apply the force to may include the pivot rod 222, the handle system 246 or other components of the system 296. The second biasing member 304 force, orientation, and connection may be determined so that it provides no force, or substantially no force, or perhaps a small force, such as enough force against the pivot bracket 248 such that it retains the ladder support member 186 against the second wall 172 of the support flange 166.

Figure 14:
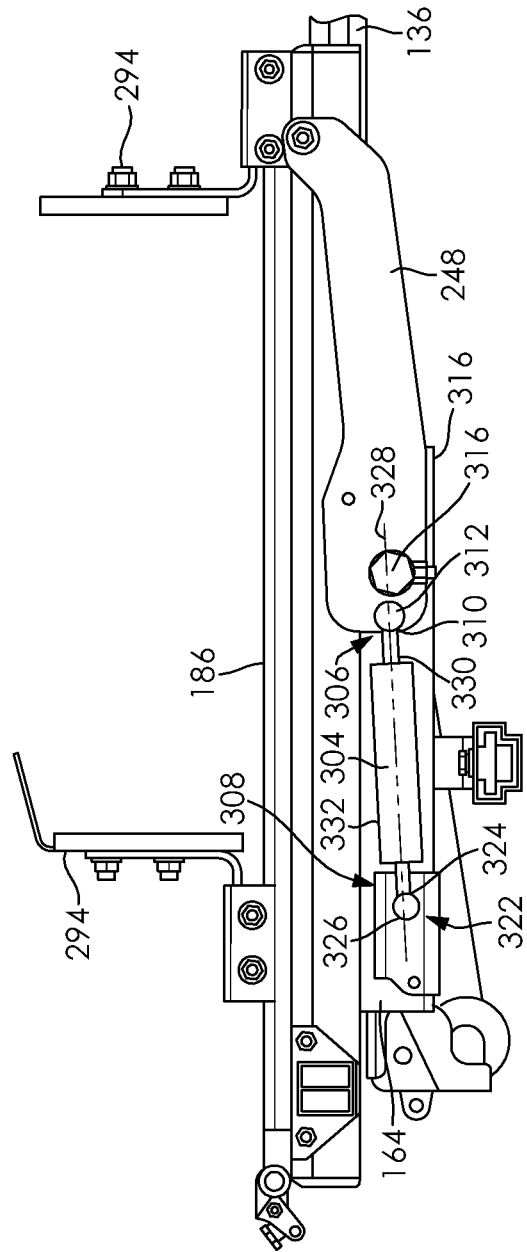
FIG. 14 depicts a portion of the ladder rack system from FIG. 11.
Figure 15:
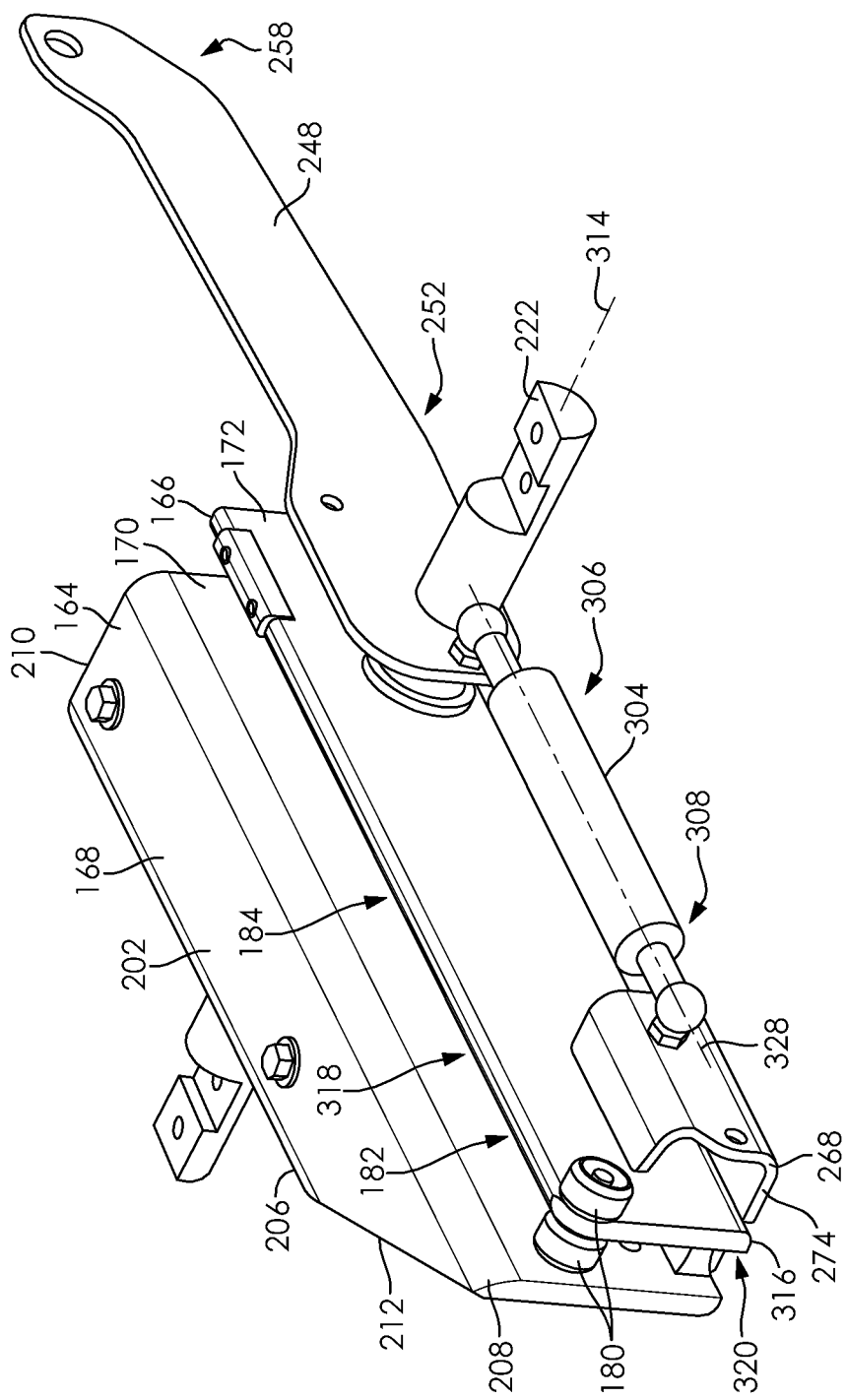
FIG. 15 depicts a portion of the ladder rack system from FIG. 11.

While a second biasing member 304 that provides a pulling force in the outboard direction has been depicted and discussed above, it is possible to also provide to use a biasing member that provides a pushing force in the inboard direction. Such a biasing member may assist in extending the system 246 from an extended or operating but not deployed condition to a deployed and extended condition. It is a discovery that by locating the first end portion 306 of the second biasing member 304 in the location noted above on the pivot bracket 248, and as depicted in FIGS. 13 and 14, that the second biasing member 304 provides further advantageously provides a force that partially or entirely maintains the ladder rack system 296 in a non-extended condition.

Figure 21:
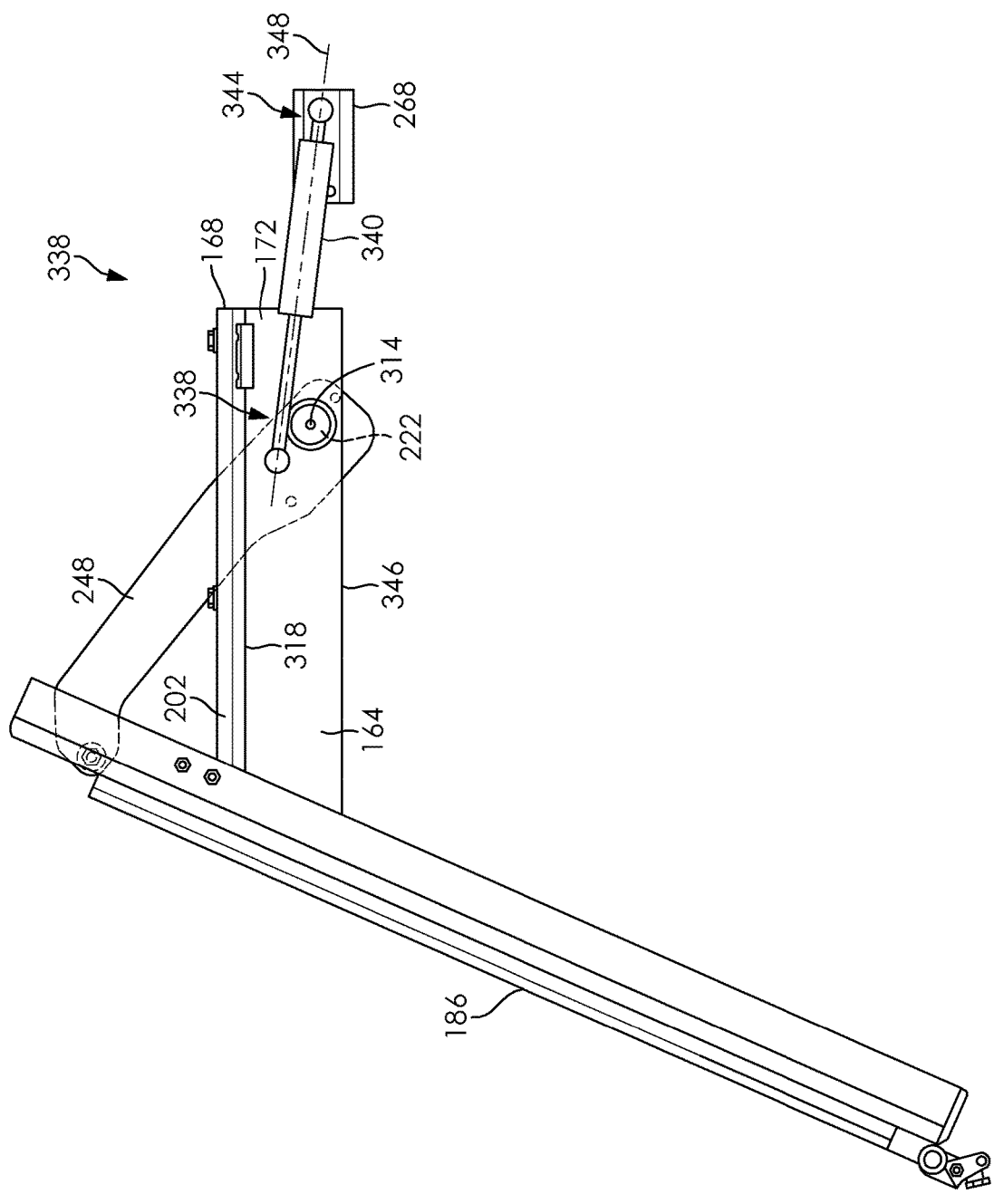
FIG. 21 is a schematic side view of portion of another embodiment of a ladder rack system in a deployed condition.
Figure 22:
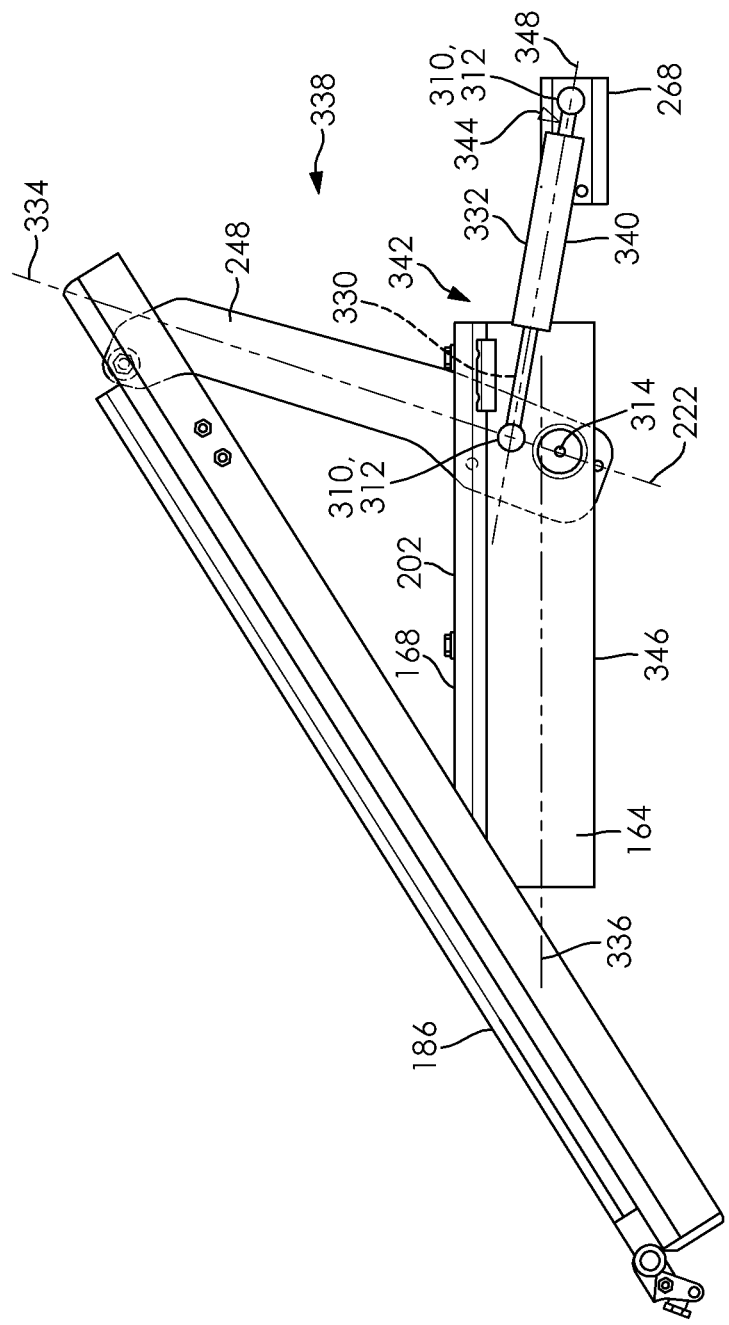
FIG. 22 depicts the portion of the system from FIG. 21 in a partially deployed condition.
Figure 23:
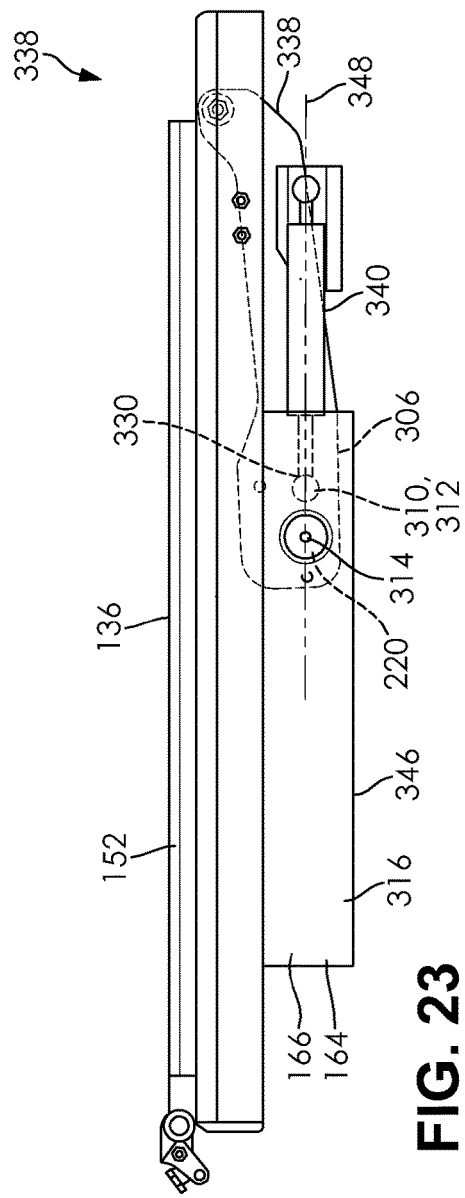
FIG. 23 depicts the portion of the system from FIG. 21 in an extended or operating condition.

Turning now to FIGS. 21-23, another embodiment of a portion of a ladder rack system 338 is schematically depicted. The ladder rack system 338 in these figures may be the same, or substantially the same, as described above and depicted in the previous figures, except as noted below. Thus, the same nomenclature will be used, including continued use of the article "the" for features that have already been introduced.

In FIGS. 21-23, a biasing member 340, such as a gas spring described above, may be used, but in a new location as described below. While a gas spring is mentioned, other structures may be used as well, or in addition, including the structures mentioned above.

The biasing member 340 may have a first end portion 342 and a second end portion 344. In the depicted embodiment, the first end portion 342 may be connected to the pivot bracket 248 as noted above. The second end portion 344 may be connected to a portion of the roof bow 136 or the support flange 166. The connection may be through a structure such as the biasing member bracket 268 described above, a related structure or other structure to connect the second end portion 244 to the roof bow 136 or support flange 166.

FIG. 21 depicts one embodiment where the system 338 may be in the fully deployed position. In this condition, the pivot rod 222 may be fully rotated, which in turn has fully rotated the connected pivot bracket 248. The pivot bracket 248, and thus the ladder support member 186, may be located at its greatest angle with respect to the upper surface 202 spanning flange 168. The pivot bracket 248 may be located at an obtuse angle with respect to the upper surface 202 of the spanning flange 168. The first end portion 342 of the biasing member 340, where it is connected to the pivot bracket 248, has moved to a position both above and outboard of the axis 314 for the pivot rod 222. The piston rod 330 of the biasing member 340 is fully, or at least substantially, extended from the housing 332. Thus, at least a portion of the piston rod 330 may be located above and outboard of the axis 314 for the pivot rod 222. The biasing member 340 is positioned to provide a generally linearly directed pulling force in the inboard direction to cause, or facilitate, a clockwise rotation of the pivot bracket 248 about the pivot rod axis 314. A biasing member bracket 268, as described above, may be locate on a roof bow 136, or an associated structure thereof or therewith, to secure the second end portion 344 of the biasing member 240.

FIG. 22 depicts the system in a condition where the pivot bracket 248 has rotated further in the clockwise direction (such for a system located on the street side of the vehicle; it would be in the counterclockwise direction for a system located on the curb side of the vehicle) and is now in an orientation substantially or generally at an acute angle with the upper surface 202 support flange 168. In other words, the major axis 334 of the pivot bracket 248 is now at an acute angle to the major axis 336 of the support flange 166. In this condition, the first end portion 342 of the biasing member 340, with the ball joint 310, 312, has now moved to a location approximately above the axis 314 of the pivot rod 222. Compared to FIG. 21, the piston rod 220 of the biasing member 340 has retracted into the housing 332 and continues to provide an inwardly directed force, such as a pulling force, on the first end portion 252 of the pivot bracket 248 thus continuing to urge the pivot bracket 248 to rotate about the pivot rod 330 in a clockwise direction (such for a system located on the street side of the vehicle; it would be in the counterclockwise direction for a system located on the curb side of the vehicle).

In FIG. 23, the pivot rod 220 has been rotated further, resulting in the pivot bracket 248 located below the upper surface 152 of the roof bow 136. The ball joint 310, 312 on the first end portion 306 of the pivot bracket 248 has now moved or rotated further and is now located on the inboard side of the pivot rod 330. Further, the piston rod 220 in the biasing member 340 has generally linearly retracted further into the housing 332 to continue to provide a constant pulling force on the pivot bracket 248. The pulling force continues until the ladder support member 186 comes to rest against the second wall 172 of the support flange 166.

Note that during the rotation of the pivot bracket 248, such as described above, the second end portion 308 of the biasing member 340 makes no substantial movements, except for perhaps the ball 312 to move within the socket 310.

In the condition depicted in FIG. 23, the ball 312 on the pivot bracket 248 may be located at, or adjacent, the height of the pivot rod 222 including the height of the axis 314 of the pivot rod 222. The height of the pivot rod axis 314 and the height of the ball 312 may be measured from the bottom surface 316 of the slide 164, such as a bottom surface 346 of the support flange 166. The ball 312 on the pivot bracket 248, again in the extended but not deployed condition, may also be located inboard from the pivot rod axis 314, such as coplanar therewith.

In such a condition, the attachment point for the first end portion 306 of the biasing member 340 at the pivot bracket 248, which may be the ball 312 on the pivot bracket 248, and thus also the first end portion 306 of the biasing member 340, may be located below the upper edge 318 of the second wall 172 and below the upper surface 202 of the spanning flange 168. Further, the ball 312 on the pivot bracket 248, and thus the first end portion 306 of the biasing member 340, is located above and outboard of the rail 104 or 106.

As noted above, FIG. 23 depicts the system 338 in an extended or operating condition, but the system 338 has not been deployed. In such a condition, the longitudinal axis 348 of the biasing member 340 may be substantially parallel the upper and/or lower surfaces 202, 204 of the spanning flange 168. In some embodiments, however, the longitudinal axis 348 may be angled, such as inclined, with respect to the upper and/or lower surfaces 202, 204 of the spanning flange 168. The incline may be on the order of 1-15 degrees, including 5-10 degrees. Either end portion 306, 308 of the biasing member 340 may be raised or lowered to provide the incline.

Further, with continued reference to the extended but not deployed condition, it may be that in some embodiments, the longitudinal axis 348 of the biasing member 340 may not be parallel the second wall 172 of the support flange 166. Instead, the longitudinal axis 348 may be angled where the angle may be such as between 1 and 15 degrees, including 5-10 degrees.

It can be appreciated from the foregoing that the biasing member 340 reduces the force an operator must exert on the pivot rod 222 in order to move the ladder support member 186 from the extended condition off of the vehicle to a rest position on the vehicle. The biasing member 340 force, orientation, and connection may also be determined so that it provides no force, or substantially no force, or perhaps a small force, such as enough force against the pivot bracket 248 such that it retains the ladder support member 186 against the second wall 172 of the support flange 166.

Figure 24:
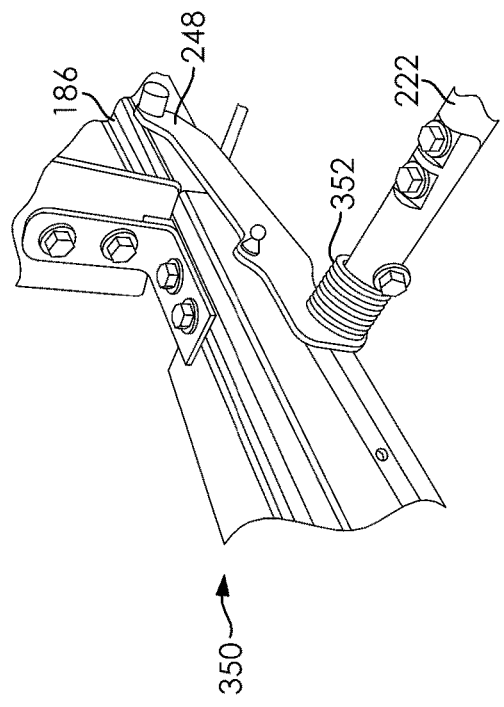
FIG. 24 depicts a perspective view of a portion of another embodiment of a ladder rack system in an extended or operating condition.

FIG. 24 depicts yet another embodiment of a system 350, which was referenced above in the previous discussions associated with the various embodiments. In this embodiment, a biasing member 352 is coaxial with the pivot rod 222. In such an embodiment, the biasing member 352 may be at least partially located about the pivot rod 222. One possible location of the biasing member 352 may be such as adjacent where the pivot rod 222 connects with one of the pivot brackets 248.

The biasing member 352 may be such as a helical coil spring that has been at least partially wrapped about, or adjacent, the intersection of the pivot rod 222 with one of the pivot brackets 248. While a helical coil spring is mentioned, other biasing members may be used including, without limitation, the other springs mentioned above.

When such a biasing member 352 is used, one end may be connected, or attached to, the pivot rod 222. And, another end of the biasing member 352 may be connected, or attached to, the support flange 166 or the roof bow 136.

The biasing member 352 may be positioned so that it provides a force on the pivot bracket 248 and/or the pivot rod 222 that reduces the force needed to move the system 350, such as a force to move the ladder support member 186 from the extended condition off of the vehicle to a rest position on the vehicle. The object the operator may apply the force to may include the pivot rod 222, the handle system 248 or other components of the system 350.

The force may be adapted to assist the pivot rod 222/pivot bracket 248 to move or rotate in a generally clockwise direction (such for a system 350 located on the street side of the vehicle; it would be in the counterclockwise direction for a system 350 located on the curb side of the vehicle), as seen along the axis 314 of the pivot rod 222 looking toward, in order, the pivot bracket 248 and support flange 166.

The force provided may reduce the amount of effort an operator must exert on the system in order to move the ladder support member 186 from the extended condition off of the vehicle to a rest position on the vehicle (also mentioned as the extended/operating condition). The coil spring force, location, and connection may also be determined so that it provides no force, or substantially no force, or perhaps a small force, such as enough force against the pivot bracket 248 such that it retains the ladder support member 186 against the second wall 172 of the support flange 166.

Turning now to FIGS. 25-33, another embodiment of a ladder rack system 354 is schematically depicted. The ladder rack system 354 in these figures may be the same, or substantially the same, as described above and depicted in FIGS. 1-23 except as noted below. Thus, the same nomenclature will be used, including continued use of the article "the" for features that have already been introduced.

Figure 25:
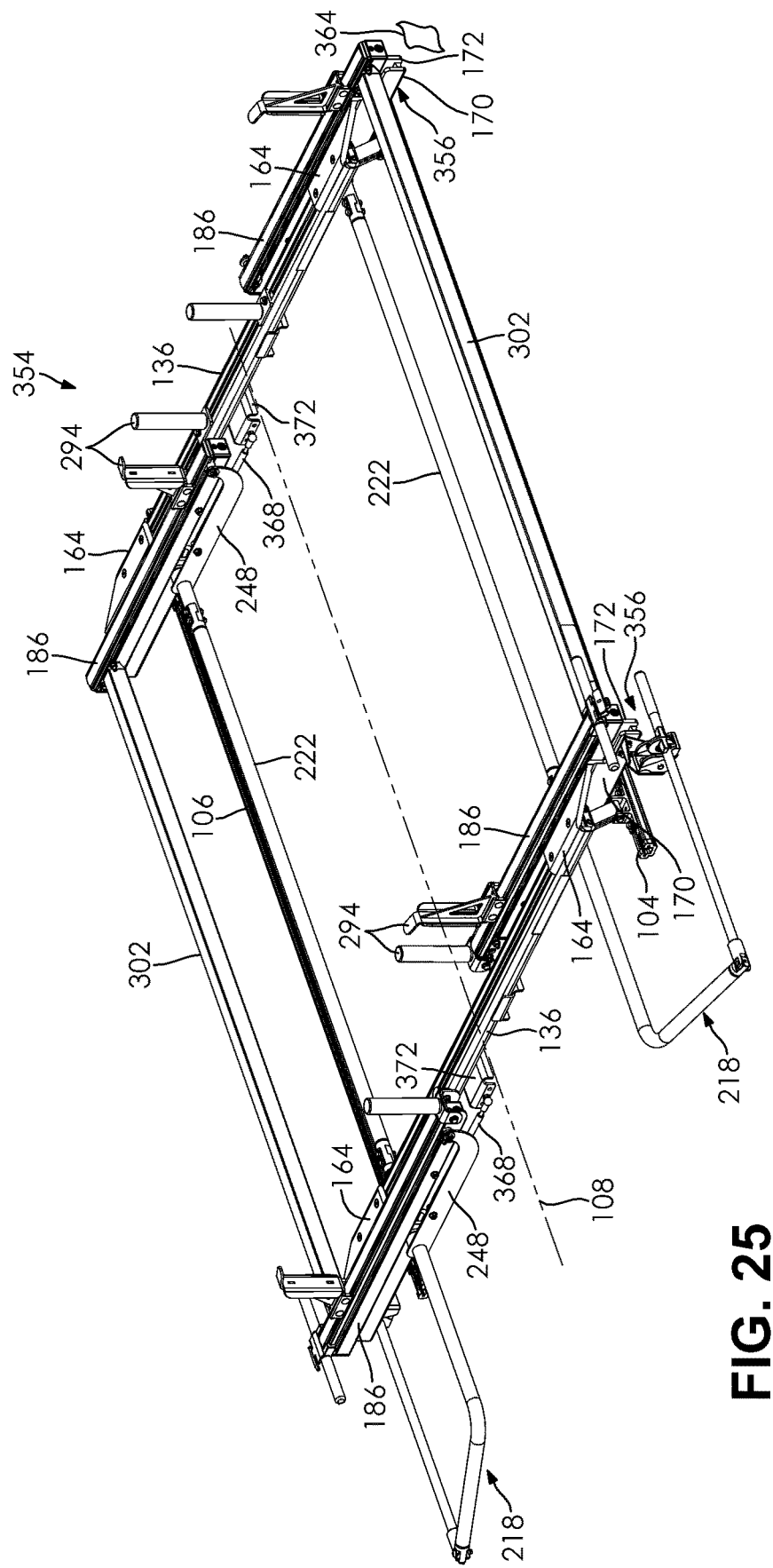
FIG. 25 depicts an upper perspective view of another embodiment of a ladder rack system for a vehicle in an operating condition.
Figure 26:
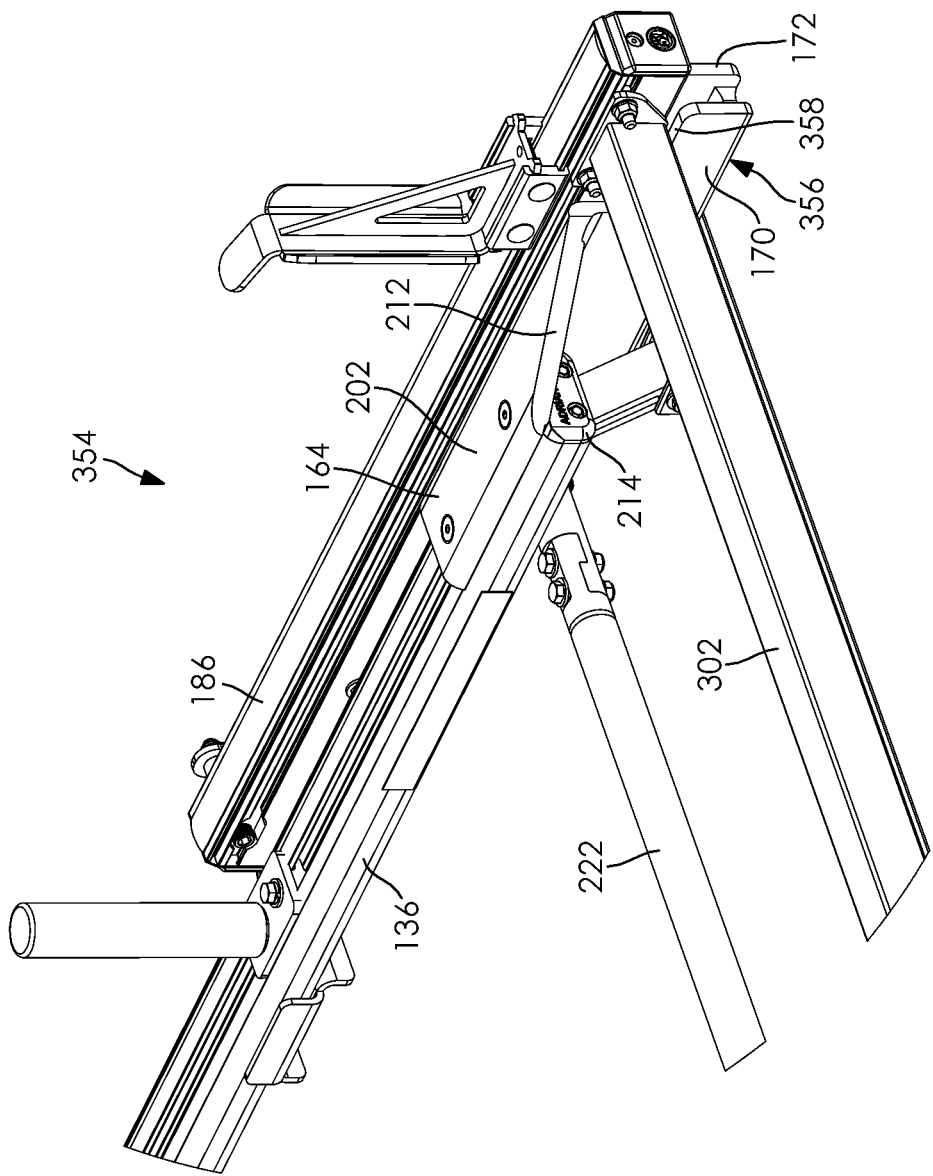
FIG. 26 depicts a portion of the ladder rack from FIG. 25.
Figure 27:
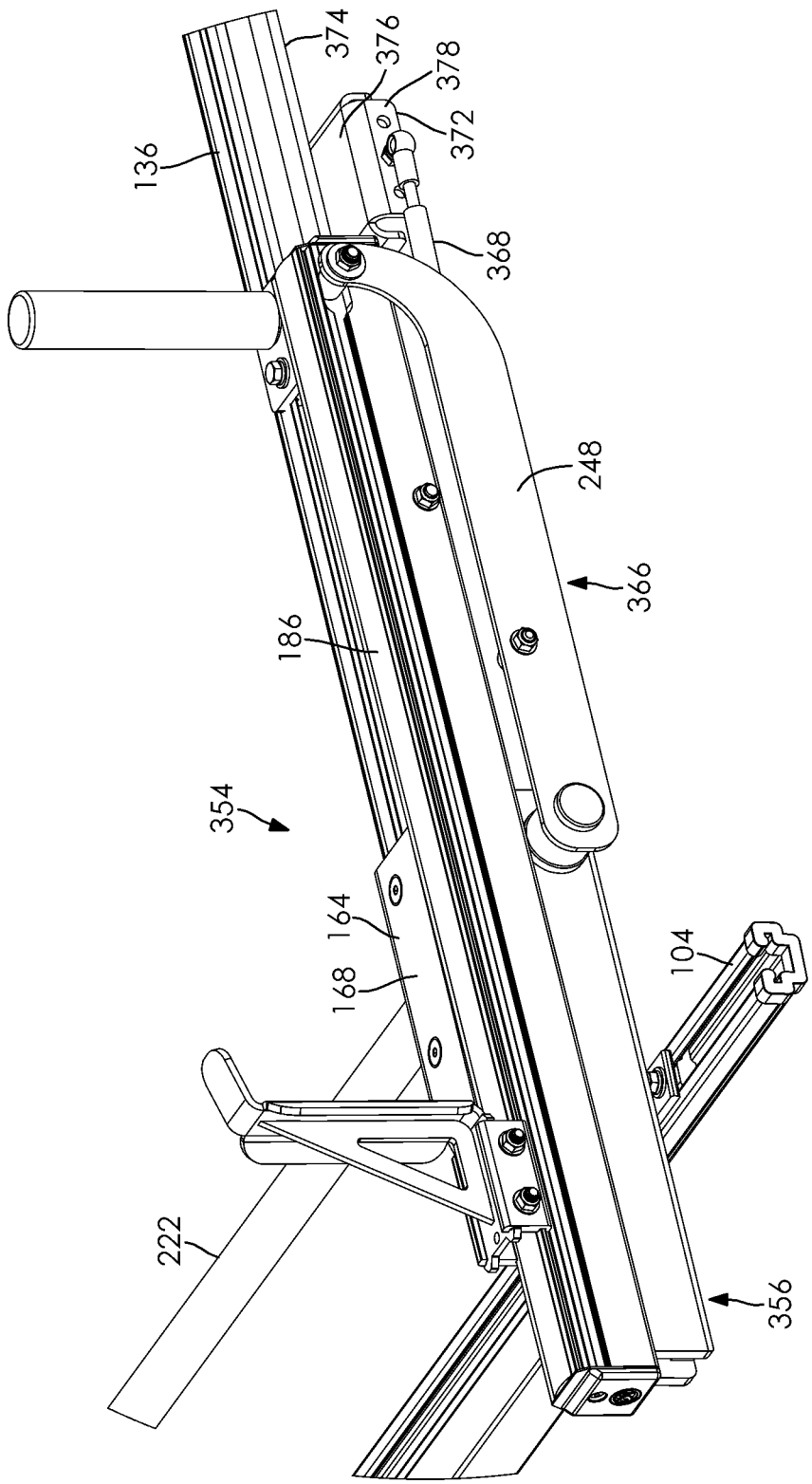
FIG. 27 depicts a portion of the ladder rack from FIG. 25.
Figure 28:
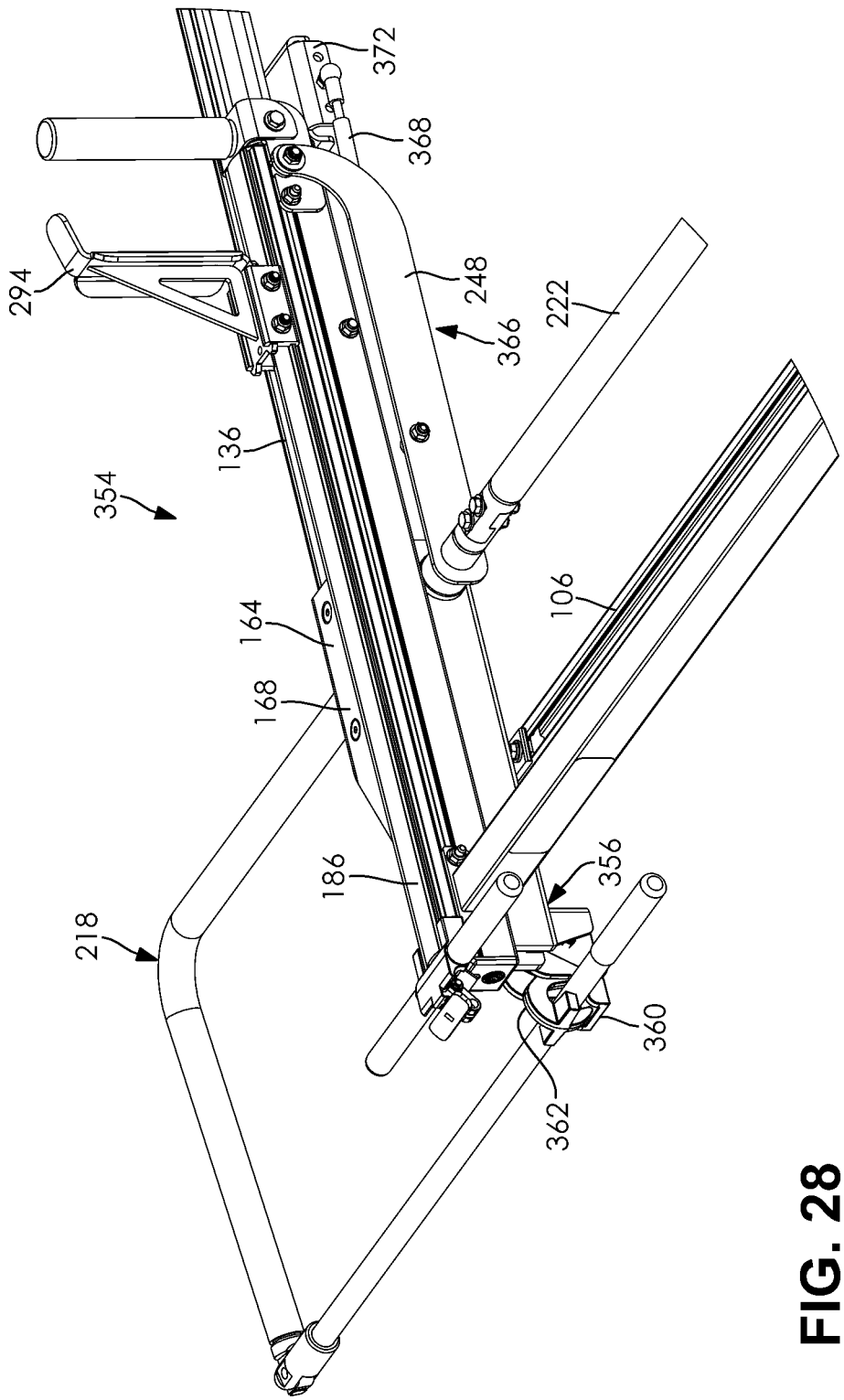
FIG. 28 depicts a portion of the ladder rack from FIG. 25.

The ladder rack system 354 in FIGS. 25-33 may be such as a double rack where the same, or substantially the same, features are located on both the driver side and the passenger side of the vehicle/rack. From all the figures in the application, however, it can be readily appreciated that the system in FIGS. 25-33 may be converted to a single rack system. FIG. 25 depicts the system 354 in the extended or operating condition, which can also be readily appreciated from the information above.

Figure 29:
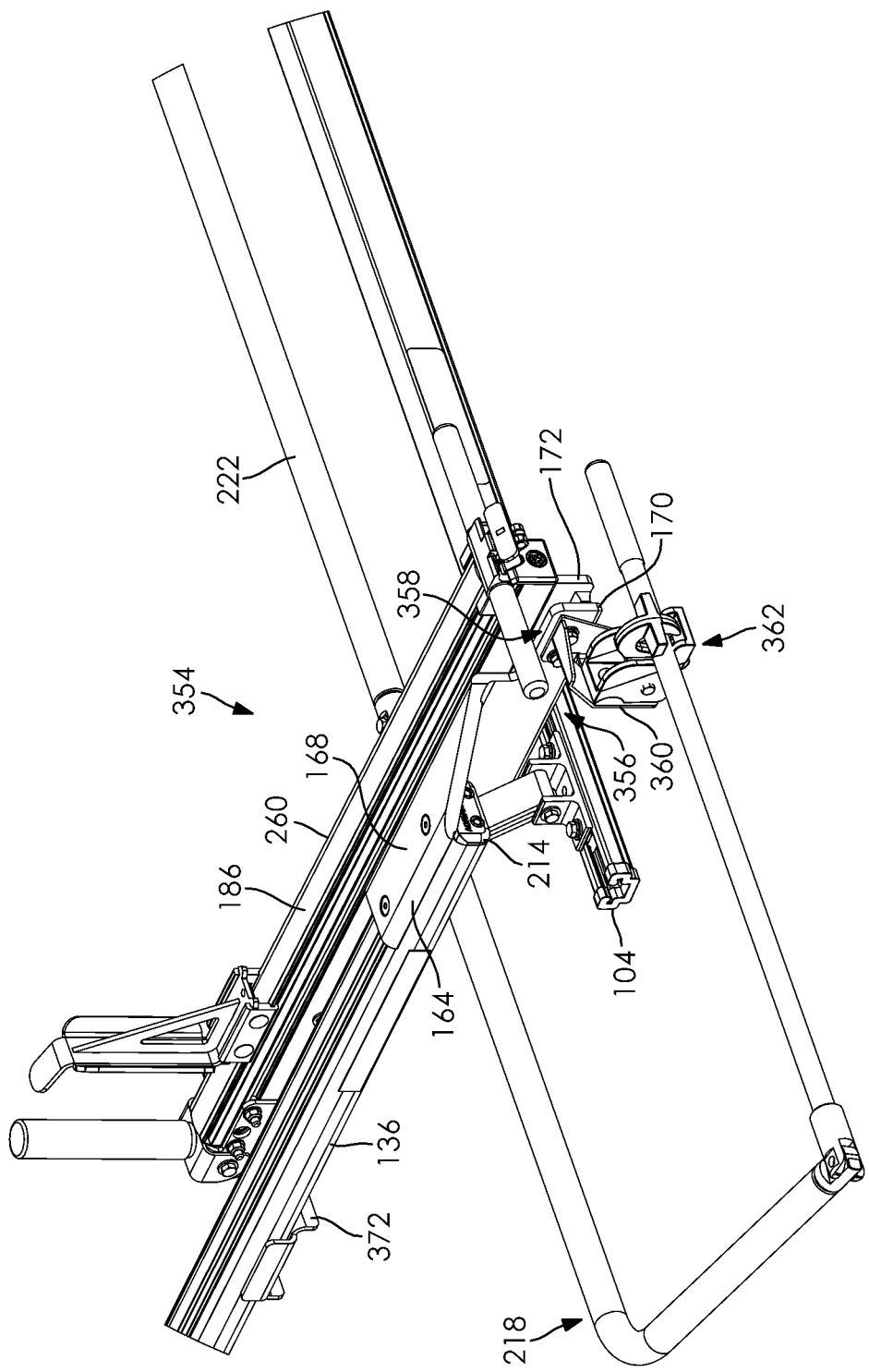
FIG. 29 depicts a portion of the ladder rack from FIG. 25.
Figure 30:
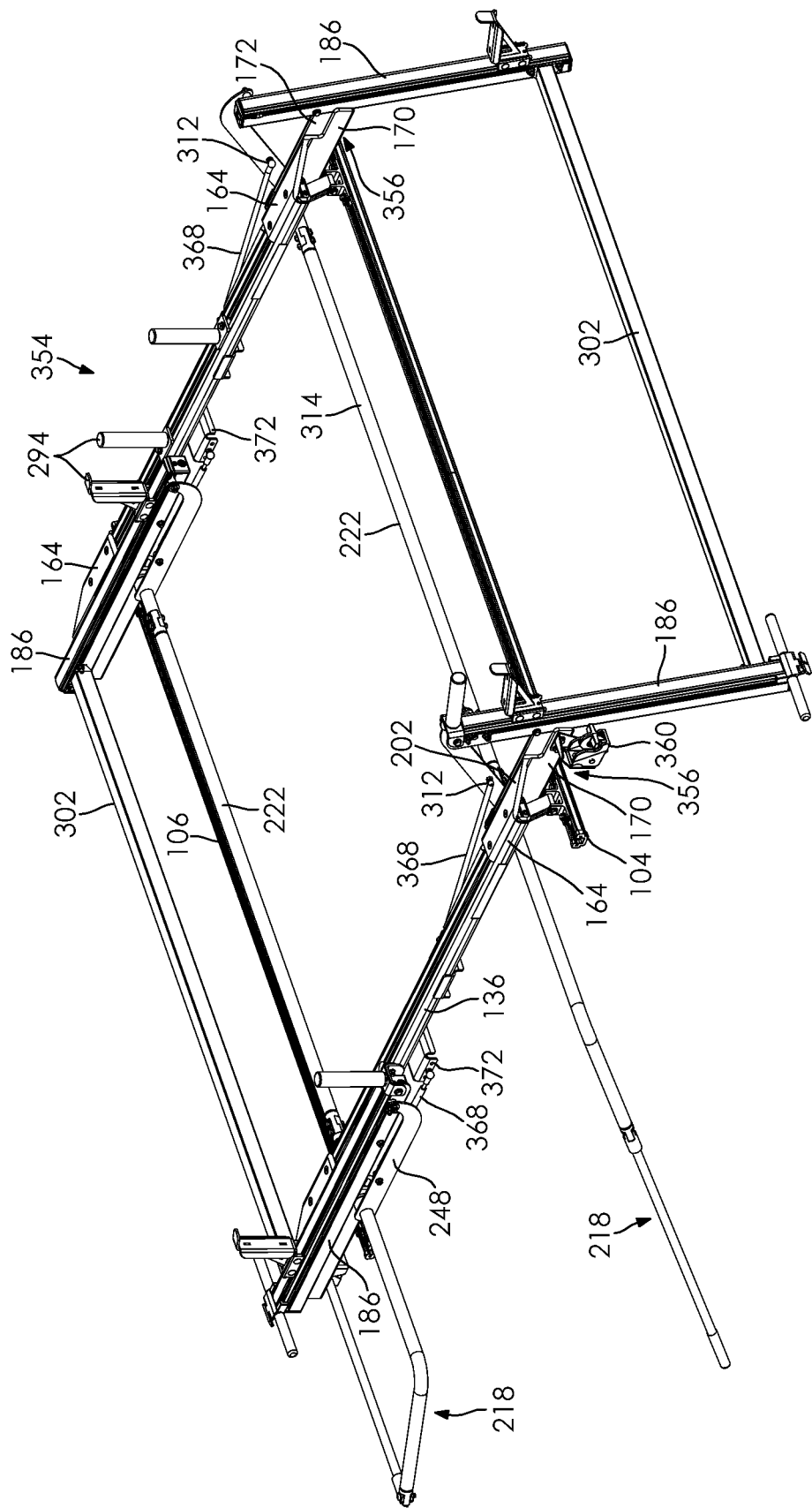
FIG. 30 depict the ladder rack from FIG. 25 in a deployed condition.
Figure 31:
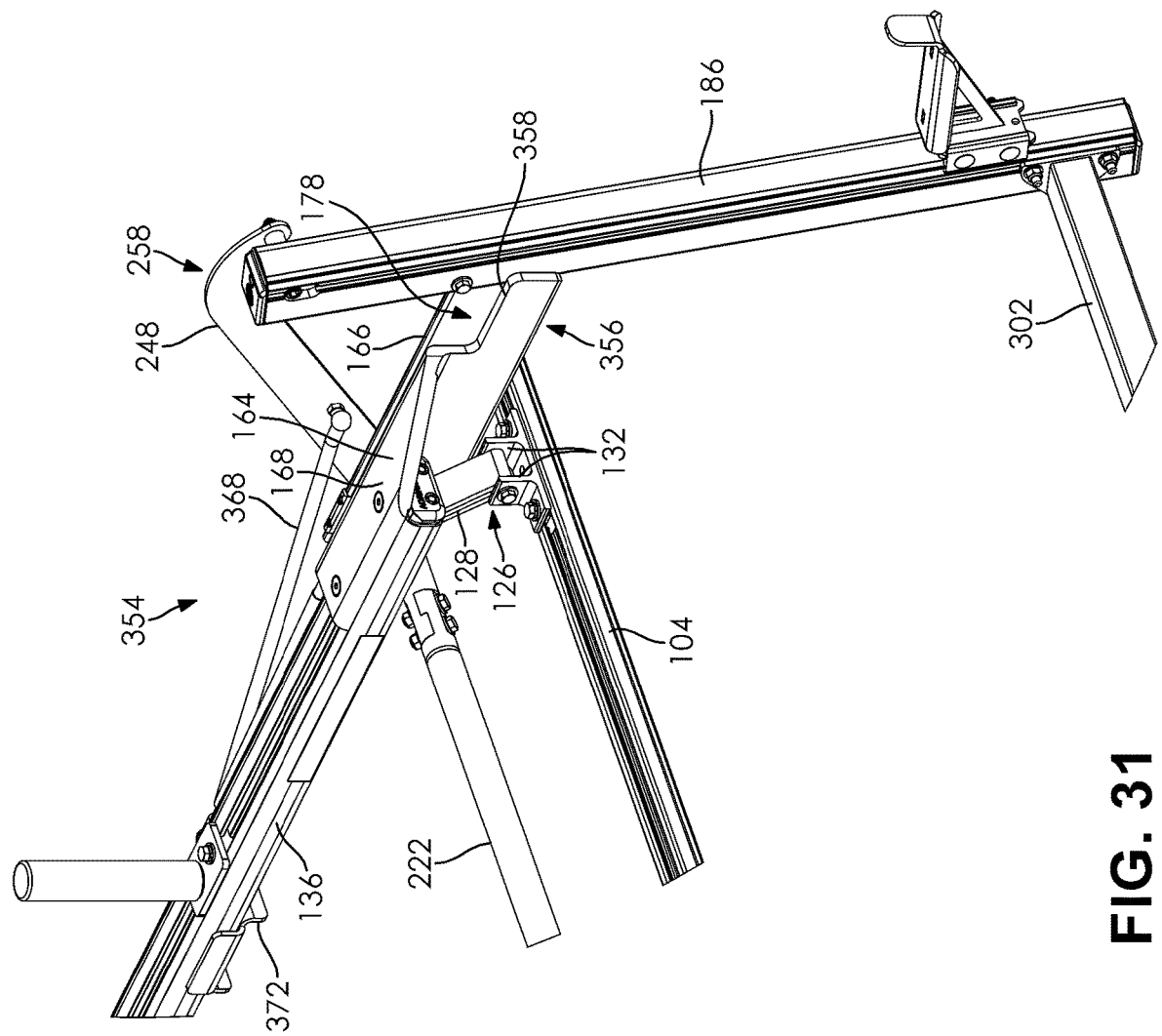
FIG. 31 depicts a portion of the ladder rack from FIG. 30.

FIGS. 25, 29, 30 and at least 31 depict one embodiment of a modification to the system 354. In this embodiment at least one of the slides 164 may be provided with an extension portion 356. The extension portion 356 may extend at least portions of the first and second walls 170, 172 in the outboard direction. In one embodiment, the second wall 172 may extend substantially continuously with the same width and height along its entire length. The first wall 170 at the extension portion 356, however, may have a reduced height compared to the inboard height of the first wall 170 and/or the height of the second wall 172.

The height of the first wall 170 in the extension portion 356 may be such as 30-70% of the inboard height of the first wall 170. In some preferred cases, the height of the first wall 170 in the extension portion may be approximately 40-60% of the inboard height of the first wall 170. Thus, an upper edge portion 358 of the first wall 170 in the extension portion 356 may be parallel, but not coplanar with the spanning flange upper surface 202.

In such cases, it may be that the first wall 170 in the extension portion 356 has substantially the same width and length as the length and width in the adjacent second wall 172. The first and second walls 170, 172 in the extension portion 356 may terminate at substantially the same outboard plane.

From the figures it can be appreciated that the depicted embodiment of the extension portion 356 may extend outboard from the outboard edge portion 212 of the spanning flange 168. In such cases, the extension portion 356 may extend substantially transversely the spanning flange 168.

In some embodiments, a handle bracket 360 may be attached to the extension portion 356 of the first wall 170. The bracket 360 may be attached to the extension portion 356 such as by mechanical fasteners, but other fastening devices and structures may be used. The bracket 360 may extend transverse the direction of the first wall 170, but other angles and direction may be used.

The bracket 360 may have a receive a latch 362 or related structure therein or thereon. The latch 362 may be secured to the bracket 360 such as by mechanical fasteners or the like. The latch 362 may be adapted to connect to the handle system 246 described above. In some embodiments, the latch 362 may receive and selectively hold at least a portion of the handle system 246 therein.

The extension portion 356 may assist in positioning the ladder support member(s) 186 further outboard compared with the previous embodiments. By further outboard, it may be that the extension portion 356 creates a greater distance between the extended ends outboard of the first and second walls 170, 172 and the first or second roof rail 104, 106 compared with the related feature on the previous embodiment. Thus, when the system 354 is in a deployed condition, such as shown in FIG. 30, the ladder support members 186 may be located a greater distance from the side of the vehicle than in the previous embodiment. It can be advantageous to locate the ladder support members 186, and any structures located on them, additional distance from the side of the vehicle to ensure sufficient space between the system 354, particularly when it is in the deployed condition, and the vehicle at least so that windows and/or doors on the side of the vehicle are accessible and useable.

Figure 32:
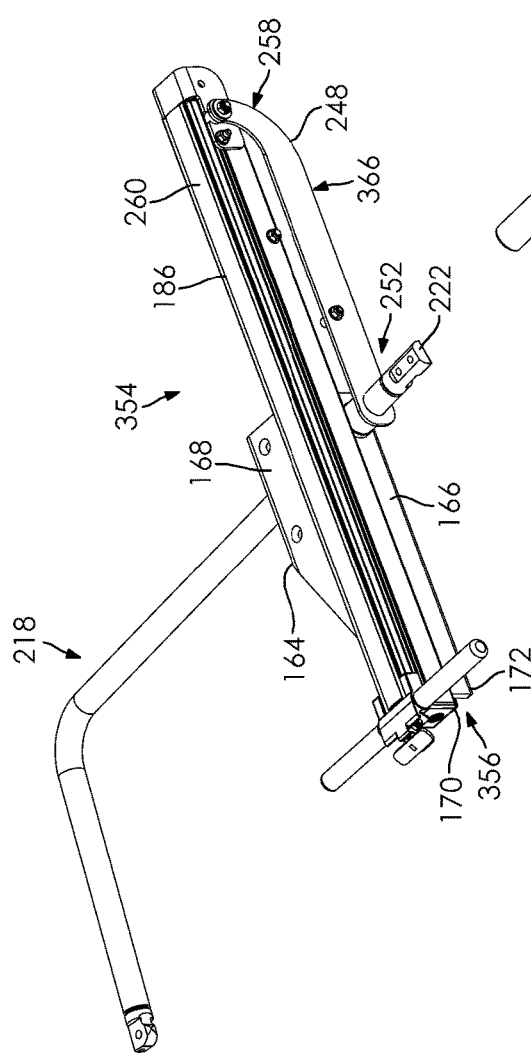
FIG. 32 depicts a portion of the ladder rack from FIG. 25.

As in a previous embodiment, the pivot rod 222 may be connected to the pivot bracket 248 as noted above to provide the same or similar functionality and purpose. The pivot bracket 248 may also have a second end portion 258, opposite the first end portion 252 that is connected to the pivot rod 222. The second end portion 258 may be connected to a ladder support member 186 as noted above. A central portion 366 may be located between the first and second end portions 252, 258, the central portion 366 may extend generally parallel the ladder support member 186. It may be preferred that the first end portion 252 and the central portion 366 of the pivot bracket 248 are located below the upper surface 260 of the ladder support member 186, as shown in FIGS. 29 and 32.

As may be appreciated from the figures, a biasing member may be attached to just one, or each, pivot bracket 248. The biasing member 368 may be such as any of the biasing members described above. In one example, the biasing member may be such as the biasing member 262. Thus, the reference numbers for like features for biasing member 262 will be used for member 368. In one embodiment, the first end portion 264 of the biasing member 368 may be connected to the first end portion 252 of the pivot bracket 248. In one example shown in FIG. 33, the first end portion 264 of the biasing member 368 is shown connected to the pivot bracket 248 somewhere between a midpoint of the pivot bracket 248 and an end of the pivot bracket 248. Generally, this area may be deemed a first end portion 252 of the pivot bracket 248. The connection may be such as noted above in the previous embodiments.

Figure 33:
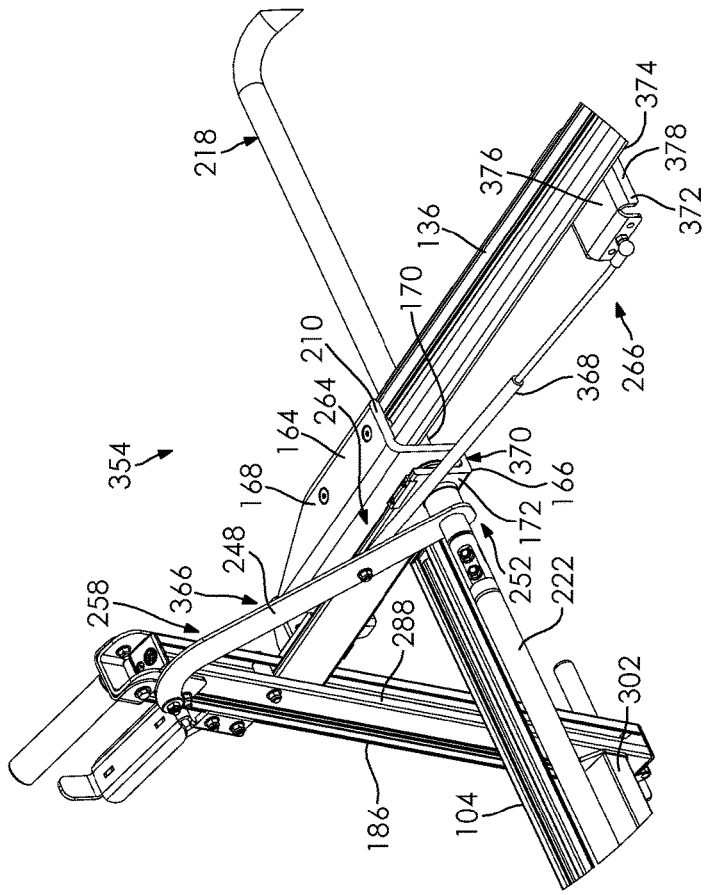
FIG. 33 depicts a portion of the ladder rack from FIG. 30.

FIG. 33 also depicts one embodiment wherein the walls 170, 172 of the support flange 166 extend parallel the roof bow 136. The figure also schematically depicts the situation where the spanning flange 168 is cantilevered off of one of the walls 170, 172 of the support flange 166. The same figure depicts one situation when one of the walls 170, 172 of the support flange 166 is adapted to be at least partially located within the receiving channel 288 located within the ladder support member 186, where the channel 288 extends parallel the roof bow 136. The figure also shows the condition where the pivot rod 222 extends through the support flange 166. Further, FIG. 33 depicts one design where a rear edge 370 of the support flange 166 and the inboard edge 210 of the spanning flange 168 are substantially coplanar with one another.

The second end portion 266 of the biasing member 368 may be connected to the roof bow 136 or components associated with the roof bow 136 or connected thereto. In some embodiments, the second end portion 266 may be connected to a biasing member bracket 372. The biasing member bracket 372 may be one piece, integrally formed and unitary with the roof bow 136, or it may be separately formed and attached to the roof bow 136 such as through welding and/or mechanical fasteners, or the like.

In one embodiment, the biasing member bracket 372 may be attached to a lower surface 374 of the roof bow 136. It may be that the biasing member bracket 372 has a slide device (not shown), or is adapted to at least partially receive the slide device, that may be selectively and movably located within the lower channel 138 of the roof bow 136. A mechanical fastener may connect the biasing member bracket 372 with the slide device where the mechanical fastener extends into the upper channel 148 of the roof bow 136. The mechanical fastener, such as the head of the fastener, may be located in the upper channel 148 to selectively move therein. The biasing member bracket 372 may be located in a location along the roof bow 136 to facilitate a connection for the second end portion 266 of the biasing member 368. At that location, the biasing member bracket 372 can be secured in place by tightening the fastener which locks the slide to the bracket 372 and the bracket 372 to the roof bow 136. It may be preferred that the biasing member bracket 372 is located inboard from the slide and the pivot rod 222 to position it for connection with the biasing member 368.

In one design, the biasing member bracket 372 may have an upper wall 376 and one or more walls that at least partially surround the upper wall. The surrounding wall(s) 378 may extend at an angle with respect to the upper wall 376, and the angle may be such as transverse.

The biasing member bracket 372 may extend transverse the primary direction of the roof bow 136, such as along the longitudinal direction. The bracket 372 may extend to align the at least one surrounding wall 378 with the second end 266 of the biasing member 368. The second end 266 of the biasing member 368 may connect with the at least one surrounding wall 378 of the bracket 372.

The first and second end portions 264, 266 of the biasing member 368 may be connected as noted above such as through ball-type mounts to permit relative movement, such as pivotal or rotational movement, between the biasing member 368 and the components they are connected to. In the operating condition, the biasing member 368 may extend generally parallel with at least a portion of the ladder support member 186 and/or at least a portion of the slide 164, which can be seen in FIG. 25.

In one embodiment of the deployed condition, the biasing member 368 may have an angle with respect to the horizontal, such as between 10-30 degrees. In such cases, the second end portion 266 of the biasing member 368 may be positioned lower than the first end portion 264 such that the second end portion 266 is vertically closer to the rails 104, 106 than the first end portion 264. It may be preferred that in any condition the biasing member 368 does not extend to the rails 104, 106 but terminates at the connection to the pivot bracket 248.

The biasing member 368 may be such as a fluid piston/cylinder combination, as noted above, that resists the movement of the ladder support member 186 as it pivots downwardly and away from the slide 164 during a deployed condition. In other embodiments, the biasing member 368 may resist the movement of the ladder support member 186 as it pivots upwardly and toward the slide 164 to reach an extended condition. The biasing member 368 may also be such as a one or more springs including compression, extension, torsion, constant force, draw bar, volute, gas and/or air springs, or other spring apparatus.

In another embodiment, the biasing member 368 may be such as a gas spring as noted above. As yet another alternative, the biasing member 368 may be such as a coil spring having one end connected to the pivot bracket 248 and another end connected to biasing member bracket 372. It may also be possible to use any combination of the above-mentioned biasing members. By way of one example, a gas spring may be used with one pivot bracket 248 and ladder support member 186 on one portion of the system 354 and a fluid piston/cylinder combination may be used with another pivot bracket 248 and ladder support member 186 on another portion of the system 354. The gas spring may be interchangeably located with the fluid piston/cylinder combination.

FIG. 30 depicts the system 354 in a deployed condition. In such a condition, the ball, such as 312, on the pivot bracket 248 may be located above the height of the pivot rod 222 including the height of an axis 314 of the pivot rod 222. The height of the pivot rod axis 314 and the height of the ball 312 may be measured from the bottom surface 316 of the slide 164, such as a bottom surface 346 of the support flange 166. The ball 312 on the pivot bracket 248 in the deployed condition may also be located outboard from the pivot rod axis 314.

In such a condition, the attachment point for the first end portion 264 of any biasing member, such as 364, at the pivot bracket 248, which may be the ball 312 on the pivot bracket 248, may be located above the upper surface 202 of the spanning flange 168. Further, the ball 312 on the pivot bracket 248, and thus the first end portion 264 of the biasing member 364, is located above and inboard of the rail 104 or 106. The second end portion 266 of the biasing member 364 may be connected to the biasing member bracket 372 as noted above.

In the deployed condition, the pivot rod 222 may be fully rotated, which in turn has fully rotated the connected pivot bracket 248. The pivot bracket 248, and thus the ladder support member 186, may be located at its greatest angle with respect to the horizontal spanning flange 166. The pivot bracket 248 may be located at an obtuse angle with respect to the horizontal, upper surface 202 of the spanning flange 166. The first end portion 264 of the biasing member 368, where it is connected to the pivot bracket 248, has moved to a position both over and outboard of the axis 314 for the pivot rod 222.

It can be appreciated from the foregoing that the biasing member type may be selected and positioned to reduce the force an operator must exert in order to move the ladder support member 186 from the deployed condition off of the vehicle to a rest position on the vehicle. The object the operator may apply the force to may include the pivot rod 222, the handle system 246 or other components of the system 354. The biasing member 368 force, orientation, and connection may be determined so that it provides no force, or substantially no force, or perhaps a small force, such as enough force against the pivot bracket 248 such that it retains the ladder support member 186 against the second wall 172 of the support flange 166.

While a biasing member 368 that provides a pulling force in the outboard direction may be used, it is possible to also provide to use a biasing member 368 that provides a pushing force in the inboard direction. Such a biasing member 368 may assist in extending the system 354 from an extended or operating but not deployed condition to a deployed and extended condition. It is a discovery that by locating the first end portion 264 of the biasing member 368 in the location noted above on the pivot bracket 248, and as depicted in the figures that the biasing member 368 further advantageously provides a force that partially or entirely maintains the ladder rack system 354 in a non-extended condition.

In accordance with the provisions of the patent statutes, the system has been described in what is considered to represent its preferred embodiments. However, it should be noted that the system can be practiced otherwise than as specifically illustrated and described without departing from its spirit or scope.

What is claimed is:

1. A ladder rack system, comprising:
   a roof bow having an upper channel and a side surface;
   a slide having a U-shaped support flange with two upstanding walls and a spanning flange cantilevered off of one of the upstanding walls, wherein said spanning flange is slidingly connected to said upper channel and said support flange is adjacent said side surface;

a ladder support member having a lower groove adapted to selectively receive a portion of said support flange therein;

a pivot bracket pivotally connected to said ladder support member, said pivot bracket adapted to selectively move said ladder support member with respect to said slide.

2. The ladder rack system of claim 1, wherein said slide is connected to said roof bow through at least one mechanical fastener extending through said slide into said upper channel wherein said fastener is connected to an insert located within said upper channel, wherein said inset and said fastener are adapted for selective movement within said upper channel.

3. The ladder rack system of claim 1, wherein said slide is adapted to selectively move along said roof bow along said upper channel between a ship-through condition when all of said spanning flange extends over said upper channel and an extended condition when a portion of said spanning flange extends beyond an end of said roof bow.

4. The ladder rack system of claim 3, wherein said support flange and said spanning flange define an outboard edge portion of the slide, wherein in said ship-through condition said outboard edge portion is located above said upper channel and in said extended condition at least a portion of said outboard edge portion is cantilevered off said roof bow.

5. The ladder rack system of claim 1, wherein said support flange is comprised of a first wall and a second wall connected by a connector wall, wherein said first and second walls extend spaced apart but parallel said side surface of said roof bow and wherein said connector wall extends parallel but is not coplanar with an upper surface of said roof bow.

6. The ladder rack system of claim 5, wherein said spanning flange has an upper surface and a lower surface defining a constant thickness between them, wherein an upper surface of the second wall is located below said lower surface.

7. The ladder rack system of claim 1, wherein said ladder support member has two walls defining said lower groove between them, wherein at least a portion of said second wall of said support flange is always located within said lower groove.

8. The ladder rack system of claim 7, wherein a roller is connected to said second wall, wherein said roller is adapted to selectively move along a track located within said lower groove.

9. The ladder rack system of claim 1, wherein a biasing member bracket is attached to the support flange, and wherein a ball mount is attached to the biasing member bracket.

10. The ladder rack system of claim 9, further comprising a biasing member extending between said ball mount on said biasing member bracket and the pivot bracket.

11. The ladder rack system of claim 10, wherein said biasing member is connected to said pivot bracket to be co-planar with a pivot bar but extending transverse thereto.

12. The ladder rack system of claim 11, wherein said biasing member is parallel said ladder support member and located below said spanning flange.

13. The ladder rack system of claim 10, wherein a connection point between the biasing member and the pivot bracket is below a pivot bar when the ladder support member is in a deployed condition.

14. The ladder rack system of claim 1, further comprising a pivot bar adapted for selective rotation is connected to said pivot bracket, wherein said pivot bar extends through pivot bar apertures in said support flange, wherein said pivot bar extends under the roof bow.

15. A ladder rack system, comprising:
a slide, comprising a two walled support flange and a spanning flange cantilevered off the support flange, wherein a first portion of the spanning flange is slidingly connected to, and overlaps with, a roof bow and a second portion of the spanning flange is adapted to selectively extend off said roof bow,
a ladder support member adapted to selectively pivot with respect to said second portion, wherein said ladder support member receives a portion of one of the walls of the support flange therein,
a biasing member being connected to a pivot bracket.

16. The ladder rack system of claim 15, wherein said walls of said support flange extend parallel the roof bow.

17. The ladder rack system of claim 15, wherein one of the walls of the support flange is adapted to be at least partially located within a linear, constant width groove located within the ladder support member wherein the groove extends parallel the roof bow.

18. The ladder rack system of claim 15, wherein a pivot bar extends through the support flange.

19. The ladder rack system of claim 18, wherein a pivot bracket has a first end connected to the pivot bar, a central portion extending parallel the ladder support member and a curved second end connected to the ladder support member.

20. The ladder rack system of claim 19, wherein the first end and the central portion of the pivot bracket are located below an upper surface of the ladder support member.

21. A slide for a ladder rack system, comprising:
a support flange, comprising:
a first wall and a second wall, said walls being parallel one another,
wherein said walls are spaced apart and connected by a connector wall along their parallel length to define a U-shape,
wherein said second wall has a roller assembly connected thereto,
wherein the roller assembly has an axis of rotation above the connector wall,
a spanning flange cantilevered from said first wall so as not to overlap the connector wall.

22. The slide of claim 21, wherein said connector wall continuously extends between lower portions of said first and second wall along their lengths.

23. The slide of claim 21, wherein a lower surface of the spanning flange is coplanar with an upper surface of the second wall, and wherein an upper surface of the spanning flange is parallel but not coplanar with the lower surface.

24. The slide of claim 21, wherein rear edges of the support flange and the spanning flange are co-planar with one another.

25. The slide of claim 21, wherein pivot rod apertures are located and aligned with one another in said first and second walls.

26. The slide of claim 21, wherein said support flange and said spanning flange are one-piece, integrally formed and unitary.

27. The slide of claim 21, wherein said angled outboard edge portion reduces the length of said first edge portion compared to said second edge portion, wherein said first edge portion has a reduced length compared to a length of the second wall.

28. A ladder rack system, comprising:
a roof bow having an upper channel and a side surface;

a slide having a U-shaped support flange and a spanning flange, wherein said spanning flange is slidingly connected to said upper channel and said support flange is adjacent said side surface;

a ladder support member having a lower groove adapted to selectively receive a portion of said support flange therein;

a pivot bracket pivotally connected to said ladder support member, said pivot bracket adapted to selectively move said ladder support member with respect to said slide; and a pivot bar adapted for selective rotation is connected to said pivot bracket, wherein said pivot bar extends under the roof bow.

* * * * *